(12) United States Patent
Ouimet

(10) Patent No.: US 8,645,223 B2
(45) Date of Patent: Feb. 4, 2014

(54) COMMERCE SYSTEM AND METHOD OF CONTROLLING THE COMMERCE SYSTEM USING AN OPTIMIZED SHOPPING LIST

(75) Inventor: Kenneth J. Ouimet, Scottsdale, AZ (US)

(73) Assignee: MyWorld, Inc., Scottsdale, AZ (US)

( * ) Notice: Subject to any disclaimer, the term of this patent is extended or adjusted under 35 U.S.C. 154(b) by 55 days.

(21) Appl. No.: 13/167,011

(22) Filed: Jun. 23, 2011

(65) Prior Publication Data

US 2012/0016764 A1 Jan. 19, 2012

Related U.S. Application Data

(63) Continuation-in-part of application No. 12/804,268, filed on Jul. 15, 2010, now Pat. No. 8,190,486, and a continuation-in-part of application No. 13/079,561, filed on Apr. 4, 2011.

(51) Int. Cl.
*G06Q 30/00* (2012.01)

(52) U.S. Cl.
USPC ........................................... 705/26.1

(58) Field of Classification Search
USPC ........................................... 705/26.1
See application file for complete search history.

(56) References Cited

U.S. PATENT DOCUMENTS

| | | |
|---|---|---|
| 7,136,829 B2 | 11/2006 | Hellal et al. |
| 7,672,876 B2 | 3/2010 | Bonner et al. |
| 7,734,513 B2 | 6/2010 | Bonner et al. |
| 7,739,157 B2 | 6/2010 | Bonner et al. |
| 7,742,952 B2 | 6/2010 | Bonner et al. |
| 7,756,755 B2 | 7/2010 | Ghosh et al. |
| 7,783,527 B2 | 8/2010 | Bonner et al. |
| 7,783,530 B2 | 8/2010 | Slemmer et al. |
| 7,792,710 B2 | 9/2010 | Bonner et al. |
| 7,848,964 B2 | 12/2010 | Bonner et al. |
| 7,917,405 B2 | 3/2011 | Bonner et al. |
| 8,019,656 B2 | 9/2011 | Baran et al. |
| 2004/0117290 A1 | 6/2004 | Shacham |
| 2005/0160014 A1 | 7/2005 | Moss et al. |

(Continued)

FOREIGN PATENT DOCUMENTS

WO 0229508 A2 4/2002

OTHER PUBLICATIONS

"30 of the Most Useful Google Products You Should Consider Using Daily" Jul. 9, 2011. See 19: Shopper. Retrieved online Nov. 28, 2012.

*Primary Examiner* — Mila Airapetian
(74) *Attorney, Agent, or Firm* — Robert D. Atkins; Patent Law Group: Atkins & Associates, P.C.

(57) ABSTRACT

A commerce system involves transactions between manufacturers, distributors, retailers, and consumers. Product information for a plurality of products is collected and stored in a database. A website is provided for a consumer to create a shopping list with weighted product attributes. A baseline product value is determined for each of the products. A consumer weighted product value is determined based on the baseline product value and the weighted product attributes. A discounted offer is generated for the consumer. A product score is determined based on the consumer weighted product value and retailer product value. The shopping list is optimized based on the product score. The optimized shopping list is provided to the consumer to assist with purchasing decisions. Purchasing decisions within the commerce system are controlled by enabling the consumer to select the products for purchase based on the optimized shopping list.

25 Claims, 9 Drawing Sheets

(56) References Cited

U.S. PATENT DOCUMENTS

| | | |
|---|---|---|
| 2006/0080274 A1 | 4/2006 | Mourad |
| 2007/0255696 A1 | 11/2007 | Desbarats |
| 2008/0167972 A1 | 7/2008 | Rodriguez et al. |
| 2008/0195472 A1 | 8/2008 | Shandelman et al. |
| 2009/0164304 A1 | 6/2009 | Otto et al. |
| 2009/0271293 A1* | 10/2009 | Parkhurst et al. ............... 705/27 |
| 2009/0299822 A1 | 12/2009 | Harari et al. |
| 2010/0217650 A1 | 8/2010 | Hartnell |

* cited by examiner

|     |         |                 | CONSUMER VALUE | FINAL PRICE | NET VALUE |
|-----|---------|-----------------|----------------|-------------|-----------|
| BB1 | PRODUCT | (BB1 ATTRIBUTES) | 2.50 | 3.00 | 0.83 |
| BB2 | PRODUCT | (BB2 ATTRIBUTES) | 3.10 | 2.60 | 1.19 |
| BB3 | PRODUCT | (BB2 ATTRIBUTES) | 3.40 | 2.30 | 1.48 |
| MB1 | PRODUCT | (MB1 ATTRIBUTES) | 4.50 | 4.38 | 1.03 |
| MB2 | PRODUCT | (MB2 ATTRIBUTES) | 4.90 | 4.25 | 1.15 |
| MB3 | PRODUCT | (MB3 ATTRIBUTES) | 4.70 | 5.10 | 0.92 |
| SB1 | PRODUCT | (SB1 ATTRIBUTES) | 0.82 | 0.96 | 0.85 |
| SB2 | PRODUCT | (SB2 ATTRIBUTES) | 0.90 | 0.84 | 1.08 |
| SB3 | PRODUCT | (SB3 ATTRIBUTES) | 0.75 | 0.67 | 1.12 |
| DB1 | PRODUCT | (DB1 ATTRIBUTES) | 7.41 | 6.75 | 1.10 |
| DB2 | PRODUCT | (DB2 ATTRIBUTES) | 6.96 | 7.10 | 0.98 |
| DB3 | PRODUCT | (DB3 ATTRIBUTES) | 6.58 | 6.50 | 1.01 |

| PRODUCT | RETAILER | DISCOUNTED PRICE | FINAL PRICE |
|---|---|---|---|
| BB3 | RETAILER 70 | $0.90 | $2.60 |
| MB2 | RETAILER 68 | 1.07 | 4.25 |
| SB3 | RETAILER 70 | 0.20 | 0.67 |
| DB1 | RETAILER 66 | 1.40 | 6.75 |

| PRODUCT | RETAILER | PRICE | PRODUCT SCORE |
|---|---|---|---|
| BREAD | RETAILER 66 | 1.90 | 2.050 |
| CANNED SOUP | RETAILER 66 | 1.00 | 0.863 |
| MILK | RETAILER 68 | 2.55 | 2.691 |
| LAUNDRY DETERGENT | RETAILER 70 | 4.39 | 4.722 | ns.

COMMERCE SYSTEM AND METHOD OF CONTROLLING THE COMMERCE SYSTEM USING AN OPTIMIZED SHOPPING LIST

CLAIM TO DOMESTIC PRIORITY

The present application is a continuation-in-part of U.S. patent application Ser. No. 12/804,268, filed Jul. 15, 2010, and claims priority to the above application pursuant to 35 U.S.C. §120. The present application is further a continuation-in-part of U.S. patent application Ser. No. 13/079,561, filed Apr. 4, 2011, and claims priority to the above applications pursuant to 35 U.S.C. §120.

FIELD OF THE INVENTION

The present invention relates in general to consumer purchasing and, more particularly, to a commerce system and method of controlling the commerce system using an optimized shopping list with recommended products and retailers.

BACKGROUND OF THE INVENTION

Economic and financial modeling and planning is commonly used to estimate or predict the performance and outcome of real systems, given specific sets of input data of interest. An economic-based system will have many variables and influences which determine its behavior. A model is a mathematical expression or representation which predicts the outcome or behavior of the system under a variety of conditions. In one sense, it is relatively easy to review historical data, understand its past performance, and state with relative certainty that past behavior of the system was indeed driven by the historical data. A more difficult task is to generate a mathematical model of the system, which predicts how the system will behave with different sets of data and assumptions.

In its basic form, the economic model can be viewed as a predicted or anticipated outcome of a system defined by a mathematical expression and driven by a given set of input data and assumptions. The mathematical expression is formulated or derived from principles of probability and statistics, often by analyzing historical data and corresponding known outcomes, to achieve a best fit of the expected behavior of the system to other sets of data. In other words, the model should be able to predict the outcome or response of the system to a specific set of data being considered or proposed, within a level of confidence, or an acceptable level of uncertainty.

Economic modeling has many uses and applications. One area in which modeling has been applied is in the retail environment. Grocery stores, general merchandise stores, specialty shops, and other retail outlets face stiff competition for limited consumers and business. Most, if not all, retail stores expend great effort to maximize sales, revenue, and profit. Economic modeling can be an effective tool in helping store owners and managers forecast and optimize business decisions. Yet, as an inherent reality of commercial transactions, the benefits bestowed on the retailer often come at a cost or disadvantage to the consumer. Maximizing sales and profits for a retailer does not necessarily expand competition and achieve the lowest price for the consumer.

On the other side of the transaction, the consumers are interested in quality, low prices, comparative product features, convenience, and receiving the most value for the money. Economic modeling can also be an effective tool in helping consumers achieve these goals. However, consumers have a distinct disadvantage in attempting to compile models for their benefit. Retailers have ready access to the historical transaction log (T-LOG) sales data, consumers do not. The advantage goes to the retailer. The lack of access to comprehensive, reliable, and objective product information essential to providing effective comparative shopping services restricts the consumer's ability to find the lowest prices, compare product features, and make the best purchase decisions.

For the consumer, some comparative product information can be gathered from various electronic and paper sources, such as online websites, paper catalogs, and media advertisements. However, such product information is sponsored by the retailer and slanted at best, typically limited to the specific retailer offering the product and presented in a manner favorable to the retailer. That is, the product information released by the retailer is subjective and incomplete, i.e., the consumer only sees what the retailer wants the consumer to see. For example, the pricing information may not provide a comparison with competitors for similar products. The product descriptions may not include all product features or attributes of interest to the consumer.

Alternatively, the consumer can visit all retailers offering a particular type of product and record the various prices, product descriptions, and retailer amenities to make a purchase decision. The brute force approach of one person physically traveling to or otherwise researching each retailer for all product information is impractical for most people. Many people do compare multiple retailers, e.g., when shopping online, particularly for high ticket items. Yet, the time people are willing to spend reviewing product information decreases rapidly with price. Little time is spent reviewing commodity items. In any case, the consumer has limited time to do comparative shopping and mere searching does not constitute an optimization of the purchasing decision. Optimization requires access to data, i.e., comprehensive, reliable, efficient, and objective product information, so the consumer remains hampered in achieving a level playing field with the retailer.

Another purpose of economic modeling is to develop a marketing plan for the retailer. The retailer may use a mass marketing campaign through a media outlet, such as a newspaper, television, and radio to promote products. A traditional mass marketing approach commonly employs a one-price-fits-all marketing strategy. The retailer puts out an advertisement to the general public, e.g., newspaper ad for a sale or discounted price on a product. Anyone and everyone that responds to the advertisement can purchase the product at the stated advertised sale price.

Marketing segmentation involves identifying and targeting specific market segments that are more likely to be interested in purchasing the retailer's products. Mass marketing generally does not lend itself to focused market segmentation, other than possibly the type of publication and geographic area where the advertisement is published. If the newspaper is a local fitness publication made available outside health oriented stores, then primarily only the consumers with an interest in fitness who might pick up the fitness publication will see the advertisement. Nonetheless, every fitness oriented consumer who acts on the advertisement receives the same sale or discounted price on the product.

In a highly competitive market, the profit margin is paper thin and consumers and products are becoming more differentiated. Consumers are often well informed through electronic media and will have appetites only for specific products. Retailers must understand and act upon the market segment which is tuned into their niche product area to make effective use of marketing dollars. The traditional mass marketing approach using gross market segmentation is insufficient to accurately predict consumer behavior across the various market segments. A more refined market strategy is needed to help focus resources on specific market segments that have the greatest potential of achieving a positive purchasing decision by the consumer for a product directed to that particular market segment. The retailers remain motivated to optimize marketing strategy, particularly pricing strategy, to maximize profit and revenue.

SUMMARY OF THE INVENTION

A need exists to individualize marketing strategy so that each specific consumer is treated as a unique market segment. Accordingly, in one embodiment, the present invention is a method of controlling a commerce system comprising the steps of collecting product information for a plurality of products, storing the product information in a database, providing a website for a consumer to create a shopping list with weighted product attributes, determining a baseline product value for each of the plurality of products, determining a consumer weighted product value based on the baseline product value and the weighted product attributes, determining a product score based on the consumer weighted product value, optimizing the shopping list based on the product score, providing the optimized shopping list to the consumer to assist with purchasing decisions, and controlling the purchasing decisions within the commerce system by enabling the consumer to select the products for purchase based on the optimized shopping list.

In another embodiment, the present invention is a method of controlling a commerce system comprising the steps of generating a shopping list for a consumer containing a product with weighted product attributes, determining a baseline product value for the product, determining a consumer weighted product value based on the baseline product value and the weighted product attributes, determining a product score based on the consumer weighted product value, optimizing the shopping list based on the product score, and utilizing the optimized shopping list to control purchasing decisions within the commerce system by enabling the consumer to select the product for purchase based on the optimized shopping list.

In another embodiment, the present invention is a method of controlling a commerce system comprising the steps of generating a shopping list for a consumer containing a product, determining a product score for the product, optimizing the shopping list based on the product score, and utilizing the optimized shopping list to control purchasing decisions within the commerce system by enabling the consumer to select the product for purchase based on the optimized shopping list.

In another embodiment, the present invention is a computer program product usable with a programmable computer processor having a computer readable program code embodied in a computer usable medium for controlling a commerce system comprising the steps of generating a shopping list for a consumer containing a product with weighted product attributes, determining a consumer weighted product value for the product, determining a product score based on the consumer weighted product value, optimizing the shopping list based on the product score, and utilizing the optimized shopping list to control purchasing decisions within the commerce system by enabling the consumer to select the product for purchase based on the optimized shopping list.

DETAILED DESCRIPTION OF THE DRAWINGS

Figure 1:
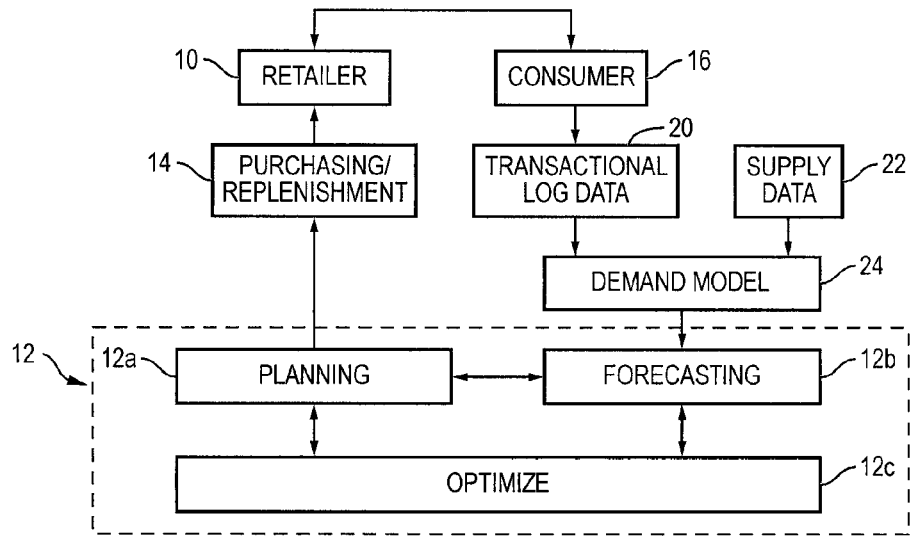
FIG. 1 illustrates a commerce system which analyzes T-LOG data to generate demand models and executes a business plan in accordance with those demand models.

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Economic and financial modeling and planning is an important business tool that allows companies to conduct business planning, forecast demand, and optimize prices and promotions to meet profit and/or revenue goals. Economic modeling is applicable to many businesses, such as manufacturing, distribution, wholesale, retail, medicine, chemicals, financial markets, investing, exchange rates, inflation rates, pricing of options, value of risk, research and development, and the like.

In the face of mounting competition and high expectations from investors, most, if not all, businesses must look for every advantage they can muster in maximizing market share and profits. The ability to forecast demand, in view of pricing and promotional alternatives, and to consider other factors which materially affect overall revenue and profitability is vital to the success of the bottom line, and the fundamental need to not only survive but to prosper and grow.

In particular, economic modeling is essential to businesses that face thin profit margins, such as general consumer merchandise and other retail outlets. Many businesses are interested in economic modeling and forecasting, particularly when the model provides a high degree of accuracy or confidence. Such information is a powerful tool and highly valuable to the business. While the present discussion will involve a retailer, it is understood that the system described herein is applicable to data analysis for other members in the chain of commerce, or other industries and businesses having similar goals, constraints, and needs.

A retailer routinely collects T-LOG sales data for most if not all products in the normal course of business. Using the T-LOG data, the system generates a demand model for one or more products at one or more stores. The model is based upon the T-LOG data for that product and includes a plurality of parameters. The values of the parameters define the demand model and can be used for making predictions about the future sales activity for the product. For example, the model for each product can be used to predict future demand or sales of the product at that store in response to a proposed price, associated promotions or advertising, as well as impact from holidays and local seasonal variations. Promotion and advertising increase consumer awareness of the product.

An economic demand model analyzes historical retail T-LOG sales data to gain an understanding of retail demand as a function of factors such as price, promotion, time, consumer, seasonal trends, holidays, and other attributes of the product and transaction. The demand model can be used to forecast future demand by consumers as measured by unit sales. Unit sales are typically inversely related to price, i.e., the lower the price, the higher the sales. The quality of the demand model—and therefore the forecast quality—is directly affected by the quantity, composition, and accuracy of historical T-LOG sales data provided to the model.

The retailer makes business decisions based on forecasts. The retailer orders stock for replenishment purposes and selects items for promotion or price discount. To support good decisions, it is important to quantify the quality of each forecast. The retailer can then review any actions to be taken based on the accuracy of the forecasts on a case-by-case basis.

Referring to FIG. 1, retailer 10 has certain product lines or services available to consumers as part of its business plan 12. The terms products and services are interchangeable in the commercial system. Retailer 10 can be a food store chain, general consumer product retailer, drug store, discount warehouse, department store, apparel store, specialty store, or service provider. Retailer 10 has the ability to set pricing, order inventory, run promotions, arrange its product displays, collect and maintain historical sales data, and adjust its strategic business plan.

Business plan 12 includes planning 12a, forecasting 12b, and optimization 12c steps and operations. Business plan 12 gives retailer 10 the ability to evaluate performance and trends, make strategic decisions, set pricing, order inventory, formulate and run promotions, hire employees, expand stores, add and remove product lines, organize product shelving and displays, select signage, and the like. Business plan 12 allows retailer 10 to analyze data, evaluate alternatives, run forecasts, and make decisions to control its operations. With input from the planning 12a, forecasting 12b, and optimization 12c steps and operations of business plan 12, retailer 10 undertakes various purchasing or replenishment operations 14. Retailer 10 can change business plan 12 as needed.

Retailer 10 routinely enters into sales transactions with customer or consumer 16. In fact, retailer 10 maintains and updates its business plan 12 to increase the number of transactions (and thus revenue and/or profit) between retailer 10 and consumer 16. Consumer 16 can be a specific individual, account, or business entity.

For each sale transaction entered into between retailer 10 and consumer 16, information describing the transaction is stored in T-LOG data 20. When a consumer goes through the check-out at a grocery or any other retail store, each of the items to be purchased is scanned and data is collected and stored by a point-of-sale (POS) system, or other suitable data storage system, in T-LOG data 20. The data includes the then current price, promotion, and merchandizing information associated with the product along with the units purchased, and the dollar sales. The date and time, and store and consumer information corresponding to that purchase are also recorded.

T-LOG data 20 contains one or more line items for each retail transaction, such as those shown in Table 1. Each line item includes information or attributes relating to the transaction, such as store number, product number, time of transaction, transaction number, quantity, current price, profit, promotion number, and consumer category or type number. The store number identifies a specific store; product number identifies a product; time of transaction includes date and time of day; quantity is the number of units of the product; current price (in US dollars) can be the regular price, reduced price, or higher price in some circumstances; profit is the difference between current price and cost of selling the item; promotion number identifies any promotion associated with the product, e.g., flyer, ad, discounted offer, sale price, coupon, rebate, end-cap, etc.; consumer identifies the consumer by type, class, region, demographics, or individual, e.g., discount card holder, government sponsored or under-privileged, volume purchaser, corporate entity, preferred consumer, or special member. T-LOG data 20 is accurate, observable, and granular product information based on actual retail transactions within the store. T-LOG data 20 represents the known and observable results from the consumer buying decision or process. T-LOG data 20 may contain thousands of transactions for retailer 10 per store per day, or millions of transactions per chain of stores per day.

TABLE 1

| T-LOG Data | | | | | | | | |
|---|---|---|---|---|---|---|---|---|
| STORE | PRODUCT | TIME | TRANS | QTY | PRICE | PROFIT | PROMOTION | CONSUMER |
| S1 | P1 | D1 | T1 | 1 | 1.50 | 0.20 | PROMO1 | C1 |
| S1 | P2 | D1 | T1 | 2 | 0.80 | 0.05 | PROMO2 | C1 |
| S1 | P3 | D1 | T1 | 3 | 3.00 | 0.40 | PROMO3 | C1 |

TABLE 1-continued

T-LOG Data

| STORE | PRODUCT | TIME | TRANS | QTY | PRICE | PROFIT | PROMOTION | CONSUMER |
|---|---|---|---|---|---|---|---|---|
| S1 | P4 | D1 | T2 | 4 | 1.80 | 0.50 | 0 | C2 |
| S1 | P5 | D1 | T2 | 1 | 2.25 | 0.60 | 0 | C2 |
| S1 | P6 | D1 | T3 | 10 | 2.65 | 0.55 | PROMO4 | C3 |
| S1 | P1 | D2 | T1 | 5 | 1.50 | 0.20 | PROMO1 | C4 |
| S2 | P7 | D3 | T1 | 1 | 5.00 | 1.10 | PROMO5 | C5 |
| S2 | P1 | D3 | T2 | 2 | 1.50 | 0.20 | PROMO1 | C6 |
| S2 | P8 | D3 | T2 | 1 | 3.30 | 0.65 | 0 | C6 |

The first line item shows that on day/time D1, store S1 had transaction T1 in which consumer C1 purchased one product P1 at $1.50. The next two line items also refer to transaction T1 and day/time D1, in which consumer C1 also purchased two products P2 at $0.80 each and three products P3 at price $3.00 each. In transaction T2 on day/time D1, consumer C2 has four products P4 at price $1.80 each and one product P5 at price $2.25. In transaction T3 on day/time D1, consumer C3 has ten products P6 at $2.65 each, in his or her basket. In transaction T1 on day/time D2 (different day and time) in store S1, consumer C4 purchased five products P1 at price $1.50 each. In store S2, transaction T1 with consumer C5 on day/time D3 (different day and time) involved one product P7 at price $5.00. In store S2, transaction T2 with consumer C6 on day/time D3 involved two products P1 at price $1.50 each and one product P8 at price $3.30.

Table 1 further shows that product P1 in transaction T1 had promotion PROMO1. PROMO1 can be any suitable product promotion such as a front-page featured item in a local advertising flyer. Product P2 in transaction T1 had promotion PROMO2 as an end-cap display in store S1. Product P3 in transaction T1 had promotion PROMO3 as a reduced sale price with a discounted offer. Product P4 in transaction T2 on day/time D1 had no promotional offering. Likewise, product P5 in transaction T2 had no promotional offering. Product P6 in transaction T3 on day/time D1 had promotion PROMO4 as a volume discount for 10 or more items. Product P7 in transaction T1 on day/time D3 had promotion PROMO5 as a $0.50 rebate. Product P8 in transaction T2 had no promotional offering. A promotion may also be classified as a combination of promotions, e.g., flyer with sale price, and end-cap with rebate, or individualized discounted offer as described below.

Retailer 10 may also provide additional information to T-LOG data 20 such as promotional calendar and events, holidays, seasonality, store set-up, shelf location, end-cap displays, flyers, and advertisements. The information associated with a flyer distribution, e.g., publication medium, run dates, distribution, product location within flyer, and advertised prices, is stored within T-LOG data 20.

Supply data 22 is also collected and recorded from manufacturers and distributors. Supply data 22 includes inventory or quantity of products available at each location in the chain of commerce, i.e., manufacturer, distributor, and retailer. Supply data 22 includes product on the store shelf and replenishment product in the retailer's storage area.

With T-LOG data 20 and supply data 22 collected, various suitable methods or algorithms can be used to analyze the data and generate demand model 24. Model 24 may use a combination of linear, nonlinear, deterministic, stochastic, static, or dynamic equations or models for analyzing T-LOG data 20 or aggregated T-LOG data and supply data 22 and making predictions about consumer behavior to future transactions for a particular product at a particular store, or across entire product lines for all stores. Model 24 is defined by a plurality of parameters and can be used to generate unit sales forecasting, price optimization, promotion optimization, markdown/clearance optimization, assortment optimization, merchandise and assortment planning, seasonal and holiday variance, and replenishment optimization. Model 24 has a suitable output and reporting system that enables the output from model 24 to be retrieved and analyzed for updating business plan 12.

Figure 2:
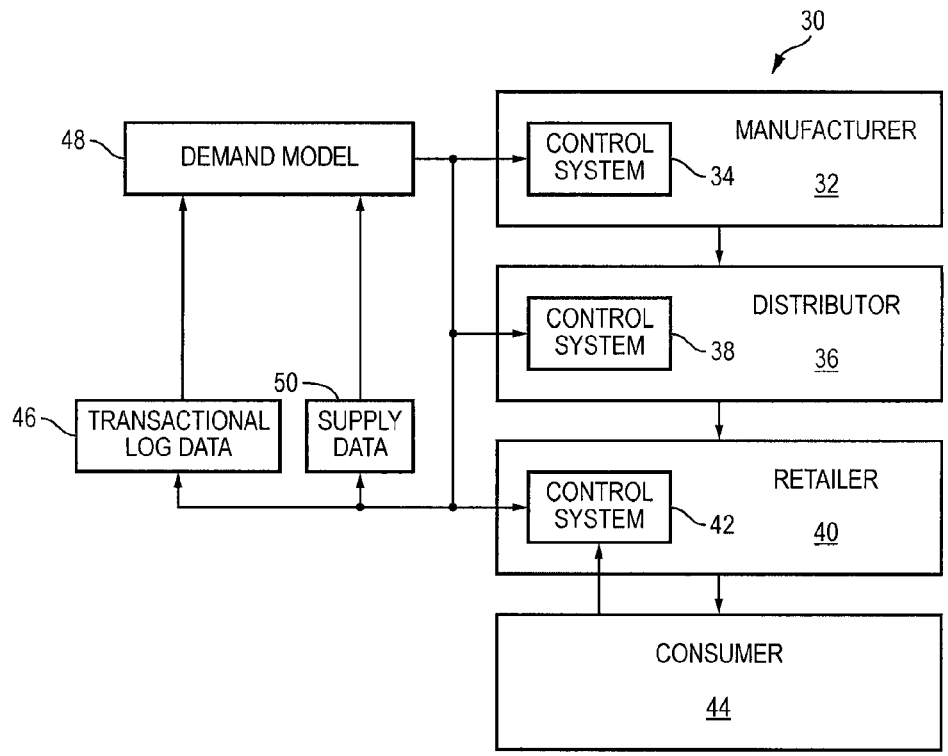
FIG. 2 illustrates a commercial supply, distribution, and consumption chain controlled by a demand model.

In FIG. 2, a commerce system 30 is shown involving the movement of goods between members of the system. Manufacturer 32 produces goods in commerce system 30. Manufacturer 32 uses control system 34 to receive orders, control manufacturing and inventory, and schedule deliveries. Distributor 36 receives goods from manufacturer 32 for distribution within commerce system 30. Distributor 36 uses control system 38 to receive orders, control inventory, and schedule deliveries. Retailer 40 receives goods from distributor 36 for sale within commerce system 30. Retailer 40 uses control system 42 to place orders, control inventory, and schedule deliveries with distributor 26. Retailer 40 sells goods to consumer 44. Consumer 44 patronizes retailer's establishment either in person or by using online ordering. The consumer purchases are entered into control system 42 of retailer 40 as T-LOG data 46.

The purchasing decisions made by consumer 44 drive the manufacturing, distribution, and retail portions of commerce system 30. More purchasing decisions made by consumer 44 for retailer 40 lead to more merchandise movement for all members of commerce system 30. Manufacturer 32, distributor 36, and retailer 40 utilize demand model 48 (similar to model 24), via respective control systems 34, 38, and 42, to control and optimize the ordering, manufacturing, distribution, sale of the goods, and otherwise execute respective business plan 12 within commerce system 30 in accordance with the purchasing decisions made by consumer 44.

Manufacturer 32, distributor 36, and retailer 40 provide historical T-LOG data 46 and supply data 50 to demand model 48 by electronic communication link, which in turn generates forecasts to predict the need for goods by each member and control its operations. In one embodiment, each member provides its own historical T-LOG data 46 and supply data 50 to demand model 48 to generate a forecast of demand specific to its business plan 12. Alternatively, all members can provide historical T-LOG data 46 and supply data 50 to demand model 48 to generate composite forecasts relevant to the overall flow of goods. For example, manufacturer 32 may consider a proposed discounted offer, rebate, promotion, seasonality, or other attribute for one or more goods that it produces. Demand model 48 generates the forecast of sales based on available supply and the proposed price, consumer, rebate, promotion, time, seasonality, or other attribute of the goods. The forecast is communicated to control system 34 by electronic communication link, which in turn controls the manufacturing process and delivery schedule of manufacturer 32 to send goods to distributor 36 based on the predicted demand ultimately determined by the consumer purchasing decisions. Likewise, distributor 36 or retailer 40 may consider a proposed discounted offer, rebate, promotion, or other attributes for one or more goods that it sells. Demand model 48 generates the forecast of demand based on the available supply and proposed price, consumer, rebate, promotion, time, seasonality, and/or other attribute of the goods. The forecast is communicated to control system 38 or control system 42 by electronic communication link, which in turn controls ordering, distribution, inventory, and delivery schedule for distributor 36 and retailer 40 to meet the predicted demand for goods in accordance with the forecast.

Figure 3:
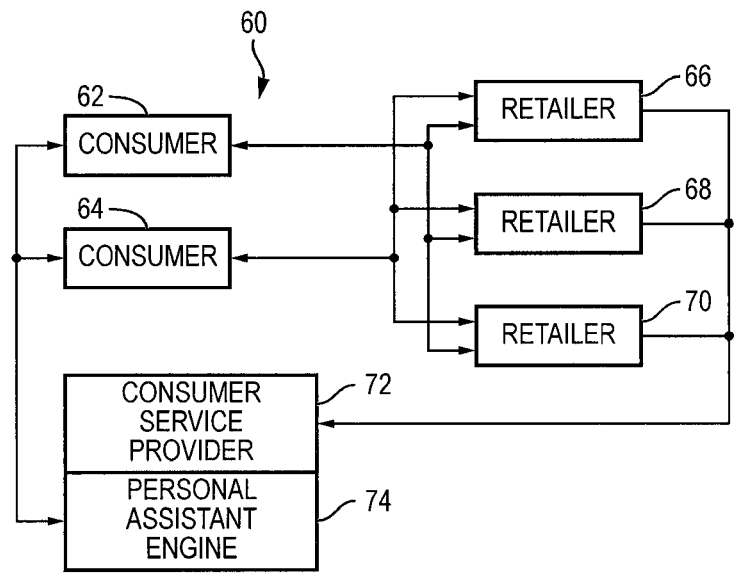
FIG. 3 illustrates commercial transactions between consumers and retailers with the aid of a consumer service provider.

FIG. 3 illustrates a commerce system 60 with consumers 62 and 64 engaged in purchasing transactions with retailers 66, 68, and 70. Retailers 66-70 are supplied by manufacturers and distributors, as described in FIG. 2. Retailers 66-70 are typically local to consumers 62-64, i.e., retailers that the consumers will likely patronize. Retailers 66-70 can also be remote from consumers 62-64 with transactions handled by electronic communication medium, e.g., phone or online website via personal computer, and delivered electronically or by common carrier, depending on the nature of the goods. Consumers 62-64 patronize retailers 66-70 either in person in the retailer's store or by electronic communication medium to select one or more items for purchase from one or more retailers. For example, consumer 62 can visit the store of retailer 66 in person and select product P1 for purchase. Consumer 62 can contact retailer 68 by phone or email and select product P2 for purchase. Consumer 64 can browse the website of retailer 70 using a personal computer and select product P3 for purchase. Accordingly, consumers 62-64 and retailers 66-70 can engage in regular commercial transactions within commerce system 60.

As described herein, manufacturer 32, distributor 36, retailers 66-70, consumers 62-64, and consumer service provider 72 are considered members of commerce system 60. The retailer generally refers to the seller of the product and consumer generally refers to the buyer of the product. Depending on the transaction within commerce system 60, manufacturer 32 can be the seller and distributor 36 can be the buyer, or distributor 36 can be the seller and retailers 66-70 can be the buyer, or manufacturer 32 can be the seller and consumers 62-64 can be the buyer.

Each consumer goes through a product evaluation and purchasing decision process each time a particular product is selected for purchase. Some product evaluations and purchasing decision processes are simple and routine. For example, when consumer 62 is conducting weekly shopping in the grocery store, the consumer sees a needed item or item of interest, e.g., canned soup. Consumer 62 may have a preferred brand, size, and flavor of canned soup. Consumer 62 selects the preferred brand, size, and flavor sometimes without consideration of price, places the item in the basket, and moves on. The product evaluation and purchasing decision process can be almost automatic and instantaneous but nonetheless still occurs based on prior experiences and preferences. Consumer 62 may pause during the product evaluation and purchasing decision process and consider other canned soup options. Consumer 62 may want to try a different flavor or another brand offering a lower price. As the price of the product increases, the product evaluation and purchasing decision process usually becomes more involved. If consumer 62 is shopping for a major appliance, the product evaluation and purchasing decision process may include consideration of several manufacturers, visits to multiple retailers, review of features and warranty, talking to salespersons, reading consumer reviews, and comparing prices. In any case, understanding the consumer's approach to the product evaluation and purchasing decision process is part of an effective model or comparative shopping service. The model must assist the consumer in finding the optimal price and product attributes, e.g., brand, quality, quantity, size, features, ingredients, service, warranty, and convenience, that are important to the consumer and tip the purchasing decision toward selecting a particular product and retailer.

In FIG. 3, consumer service provider 72 is a part of commerce system 60. Consumer service provider 72 is a third party that assists consumers 62-64 with the product evaluation and purchasing decision process by providing access to an optimization model or comparative shopping service. Consumer service provider 72 works with consumers 62-64 and retailers 66-70 to control commercial transactions within commerce system 60 by optimizing the selection of products by price and other attributes. More specifically, consumer service provider 72 operates and maintains personal assistant engine 74 that prioritizes product attributes and optimizes product selection according to the consumer's preferences. In addition, personal assistant engine 74 generates a discounted offer for a product to entice a positive purchasing decision by a specific consumer. The personalized assistant engine 74 saves the consumer considerable time and money by providing access to a comprehensive, reliable, and objective optimization model or comparative shopping service.

Figure 4:
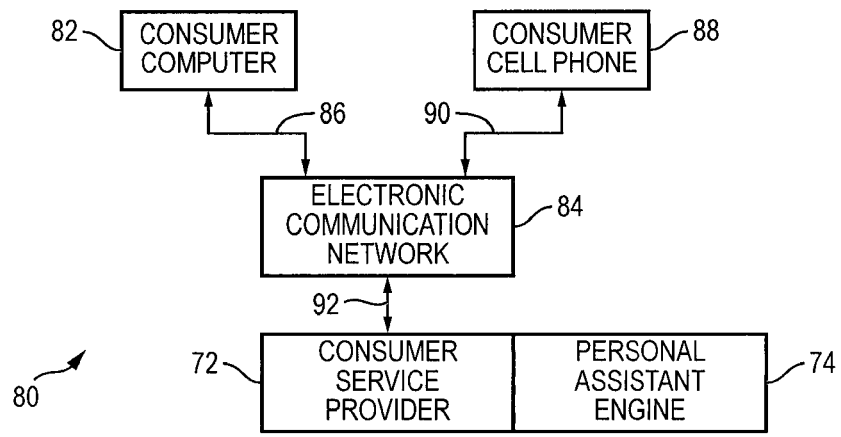
FIG. 4 illustrates an electronic communication network between the consumers and consumer service provider.

The personal assistant engine 74 can be made available to consumers 62-64 via computer-based online website or other electronic communication medium, e.g., wireless cell phone or other personal communication device. FIG. 4 shows an electronic communication network 80 for transmitting information between consumers 62-64, retailers 66-70, and consumer service provider 72. A consumer operating with computer 82 is connected to electronic communication network 84 by way of communication channel or link 86. Likewise, a consumer operating with a cellular telephone or other wireless communication device 88 is connected to electronic communication network 84 by way of communication channel or link 90. The electronic communication network 84 is a distributed network of interconnected routers, gateways, switches, and servers, each with a unique internet protocol (IP) address to enable communication between individual computers, cellular telephones, electronic devices, or nodes within the network. In one embodiment, electronic communication network 84 is a global, open-architecture network, commonly known as the Internet. Communication channels 86 and 90 are bi-directional and transmit data between consumer computer 82 and consumer cell phone 88 and electronic communication network 84 in a hard-wired or wireless configuration. For example, consumer computer 82 has email, texting, and Internet capability, and consumer cell phone 88 has email, texting, and Internet capability.

The electronic communication network 80 further includes consumer service provider 72 with personal assistant engine 74 in electronic communication with network 84 over communication channel or link 92. Communication channel 92 is bi-directional and transmits data between consumer service provider 72 and electronic communication network 84 in a hard-wired or wireless configuration.

Figure 5:
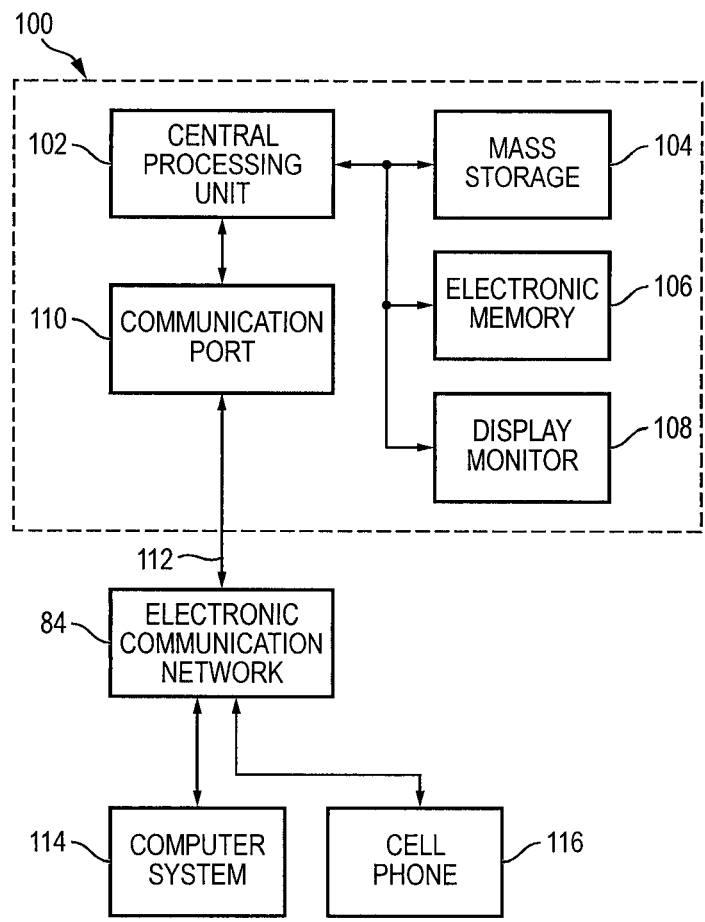
FIG. 5 illustrates a computer system operating with the electronic communication network.

Further detail of the computer systems used in electronic communication network 80 is shown in FIG. 5 as a simplified computer system 100 for executing the software program used in the electronic communication process. Computer system 100 is a general purpose computer including a central processing unit or microprocessor 102, mass storage device or hard disk 104, electronic memory 106, display monitor 108, and communication port 110. Communication port 110 represents a modem, high-speed Ethernet link, wireless, or other electronic connection to transmit and receive input/output (I/O) data over communication link 112 to electronic communication network 84. Computer system or server 114 can be configured as shown for computer 100. Computer system 114 and cellular telephone 116 transmit and receive information and data over communication network 84.

Computer systems 100 and 114 can be physically located in any location with access to a modem or communication link to network 84. For example, computer 100 or 114 can be located in the consumer's home or business office. Consumer service provider 72 may use computer system 100 or 114 in its business office. Alternatively, computer 100 or 114 can be mobile and follow the user to any convenient location, e.g., remote offices, consumer locations, hotel rooms, residences, vehicles, public places, or other locales with electronic access to electronic communication network 84.

Each of the computers run application software and computer programs, which can be used to display user interface screens, execute the functionality, and provide the electronic communication features as described below. The application software includes an Internet browser, local email application, word processor, spreadsheet, and the like. In one embodiment, the screens and functionality come from the application software, i.e., the electronic communication runs directly on computer system 110 or 114. Alternatively, the screens and functions are provided remotely from one or more websites on servers within electronic communication network 84.

The software is originally provided on computer readable media, such as compact disks (CDs), external drive, or other mass storage medium. Alternatively, the software is downloaded from electronic links, such as the host or vendor website. The software is installed onto the computer system hard drive 104 and/or electronic memory 106, and is accessed and controlled by the computer operating system. Software updates are also electronically available on mass storage medium or downloadable from the host or vendor website. The software, as provided on the computer readable media or downloaded from electronic links, represents a computer program product containing computer readable program code embodied in a computer program medium. Computers 100 and 114 run application software for executing instructions for communication between consumers 82 and 88 and consumer service provider 72, gathering product information, generating consumer models or comparative shopping services, and evaluating promotional programs. The application software is an integral part of the control of purchasing decisions within commerce system 60.

The electronic communication network 80 can be used for a variety of business, commercial, personal, educational, and government purposes or functions. For example, the consumer using computer 114 can communicate with consumer service provider 72 operating on computer 100, and the consumer using cellular telephone 116 can communicate with consumer service provider 72 operating on computer 100. The electronic communication network 80 is an integral part of a business, commercial, professional, educational, government, or social network involving the interaction of people, processes, and commerce.

Figure 6:
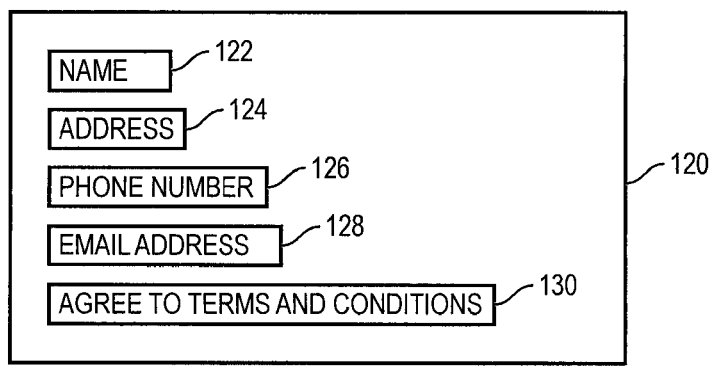
FIG. 6 illustrates a consumer profile registration webpage with the consumer service provider.

To interact with consumer service provider 72, consumers 62 and 64 first create an account and profile with the consumer service provider. Consumers 62 and 64 can use some features offered by consumer service provider 72 without creating an account, but full access requires completion of a registration process. The consumer accesses website 120 operated by consumer service provider 72 on computer system 100 and provides data to complete the registration and activation process, as shown in FIG. 6. The consumer can access website 120 using computer 114 or cellular telephone 116 by typing the uniform resource locator (URL) for website 120, or by clicking on a banner located on another website 120, which re-directs the consumer to a predetermined landing page for website 120. The data provided by the consumer to consumer service provider 72 may include name in block 122, address with zip code in block 124, phone number in block 126, email address in block 128, and other information and credentials necessary to establish a profile and identity for the consumer. The consumer's address and zip code are important as shopping is often a local activity. The consumer agrees to the terms and conditions of conducting electronic communication through consumer service provider 72 in block 130.

Figure 7:
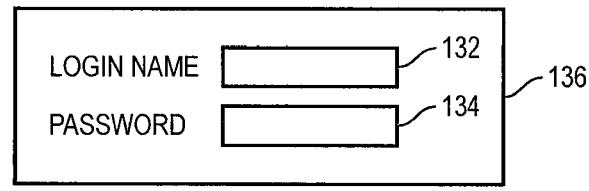
FIG. 7 illustrates a consumer login webpage for the consumer service provider.

The consumer's profile is stored and maintained within consumer service provider 72. The consumer can access and update his or her profile or interact with personal assistant engine 74 by entering login name 132 and password 134 in webpage 136, as shown in FIG. 7. The consumer name can be any personal user name, nickname, number, or email address that uniquely identifies the consumer and the password can be assigned to or selected by the consumer. Accordingly, the consumer's profile and personal data remains secure and confidential within consumer service provider 72. Once logged in, the consumer can change personal information, update the profile, access personal incentives and other offers, and otherwise interact with personal assistant engine 74.

Figure 8:
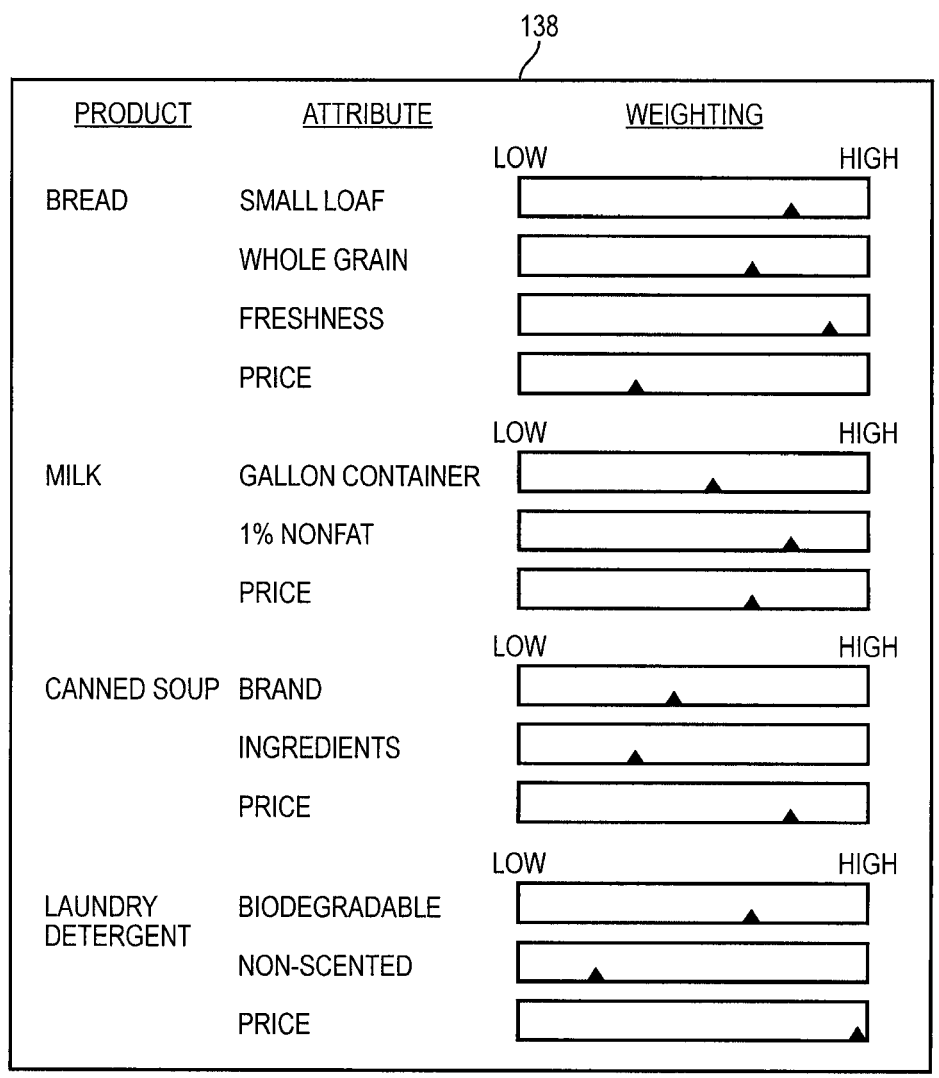
FIG. 8 illustrates a shopping list with preference levels for product attributes defined by the consumer and entered into a personal assistant engine.

One feature of personal assistant engine 74 is webpage 138, as shown in FIG. 8, which allows the consumer to enter a list of products of interest or need, i.e., to create a shopping list. In webpage 138, the consumer can enter commonly purchased or anticipated purchase products. Each product will have product attributes weighted by consumer preference. The consumer weighted attribute values reflect the level of importance or preference that the consumer bestows on each product attribute. Webpage 138 can display a list of available product attributes associated with each product category. Consumer 62 defines one or more product attributes to each product and assigns a weighted preference for each product attribute from 0 (lowest importance) to 9 (highest importance). In one embodiment, the weighted preference is selected with a sliding scale via a computer interface. The sliding scale adjusts the preference level of the product attribute by moving a pointer along the length of the sliding scale. Alternatively, a predetermined value can be selected with a click operation via computer interface. The predetermined values can be 0-9, "always", "never", or other designator meaningful to the consumer. The computer interface can be color coded or otherwise highlighted to assist with assigning a preference level for the product attribute.

The available product attributes can be product-specific attributes, diet/health/nutrient related product attributes, lifestyle related product attributes, environment related product attributes, allergen related product attributes, and social/society related product attributes. The product-specific attributes can include brand, ingredients, size, price, freshness, retailer preference, warranty, and the like. For example, consumer 62 may define the products of interest as bread, milk, canned soup, and laundry detergent. The consumer adds product attributes for each product and, using a sliding scale, assigns a preference level for each product attribute, as shown in webpage 138. The sliding scale adjusts the preference level of the product attribute by dragging a pointer along the length of the sliding scale. In the present example, the consumer preference levels for bread attributes are 7 for small loaf, 6 for whole grain, 8 for freshness, and 3 for price. The consumer preference levels for milk attributes are 5 for gallon container, 7 for 1% low fat, and 6 for price. The consumer preference levels for canned soup attributes are 4 for brand, 3 for product ingredients, and 7 for price. The consumer preference levels for laundry detergent attributes are 6 for biodegradable, 2 for non-scented, and 9 for price.

The consumer can also identify a specific preferred retailer as an attribute with an assigned preference level based on convenience and personal experience. The consumer may assign value to shopping with a specific retailer because of specific products offered by that store, familiarity with the store layout, good consumer service experiences, or location that is convenient on the way home from work, picking up the children from school, or routine weekend errand route.

Personal assistant engine 74 stores the shopping list and weighted product attributes of each specific consumer for future reference and updating. Personal assistant engine 74 can also store prices, product descriptions, names and locations of the retail stores selling the products, offer histories, purchase histories, as well as various rules, policies and algorithms. The individual products in the shopping list can be added or deleted and the weighted product attributes can be changed by the consumer. The shopping list entered into personal assistant engine 74 is specific for each consumer and allows consumer service provider 72 to track specific products and preferred retailers selected by the consumer.

In the business transactions between consumers 62-64 and retailers 66-70, consumer service provider 72 plays an important role in terms of increasing sales for the retailer, while providing the consumer with the most value for the money, i.e., creating a win-win scenario. More specifically, consumer service provider 72 operates as an intermediary between special offers and discounts made available by the retailer and distribution of those individualized offers to the consumers.

Figure 9A:
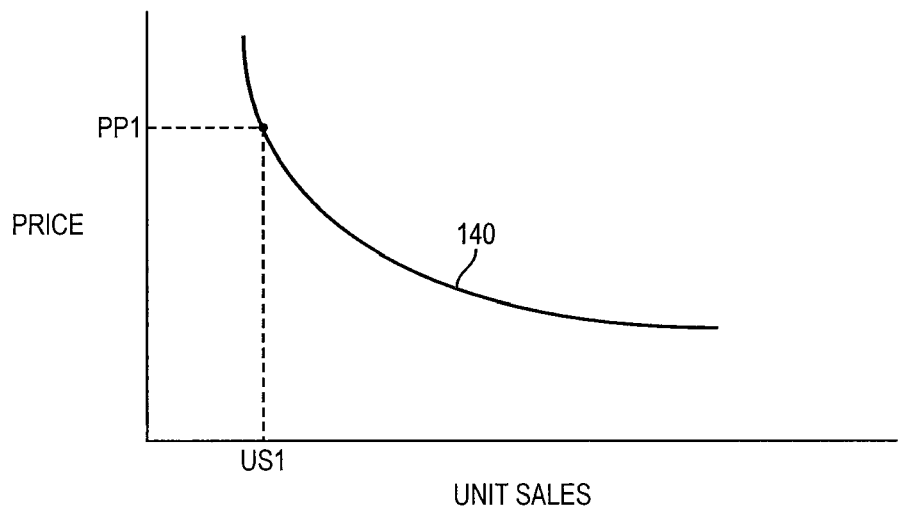
FIGS. 9a-9b illustrate demand curves of price versus unit sales.

To explain the role of consumer service provider 72, first consider demand curve 140 of price versus unit sales, as shown in FIG. 9a. In demand curve 140 for a given product P, as price increases, unit sales decrease and, conversely, as price decreases, unit sales increase. At price point PP1, the unit sales are US1. The revenue attained by the retailer is given as PP1*US1. Thus, using a conventional mass marketing strategy as described in the background, if the retailer offers an across the board discounted offer or sale price PP1 to all consumers, e.g., via a newspaper advertisement, then, according to demand curve 140, the expected unit sales will be US1 and the retailer revenue is PP1*US1. That is, those consumers with a purchasing decision threshold of PP1 will buy product P and those consumers with a purchasing decision threshold less than PP1 will not buy product P. The conventional mass marketing approach has missed the opportunity to sell product P at price points below PP1. The retailer loses potential revenue that could have been earned at lower price points.

Figure 9B:
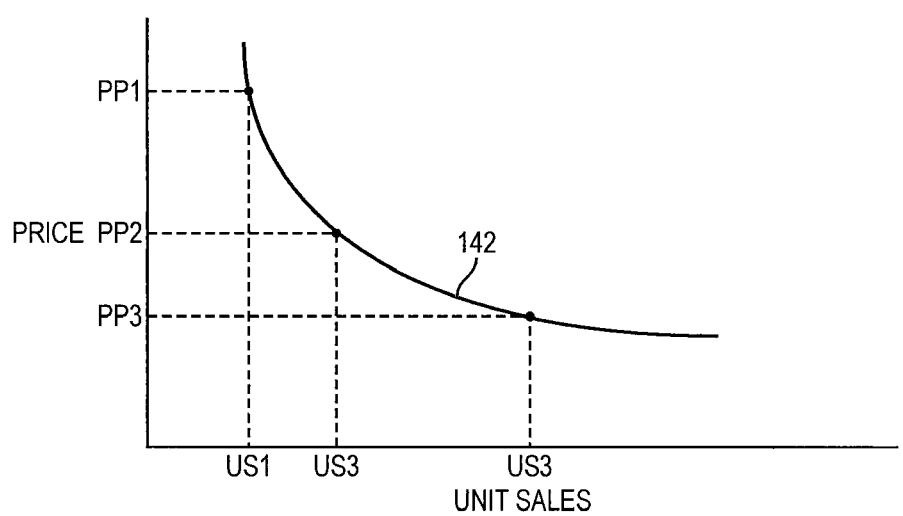

Now consider demand curve 142 in FIG. 9b with multiple price points PP1, PP2, and PP3, each capable of generating a profit for the retailer. The number of price points that can be assigned on demand curve 142 differ by as little as one cent, or a fraction of a cent. With a consumer targeted marketing approach, those consumers with a purchasing decision threshold of PP1 will buy product P at that price, those consumers with a purchasing decision threshold of PP2 will buy product P at that price, and those consumers with a purchasing decision threshold of PP3 will buy product P at that price. The retailer now has the potential revenue of PP1*US1+PP2*US2+PP3*US3. Although the profit margins for price points PP2 and PP3 are less than price point PP1, the unit sales US2 and US3 will be greater than unit sales US1. The total revenue for the retailer under FIG. 9b is greater than the revenue under FIG. 9a.

Under the consumer targeted marketing approach, each individual consumer receives a price point with an individualized discounted offer, i.e., PP1, PP2, or PP3, from the retailer for the purchase of product P. The individualized discounted offer is set according to the individual consumer price threshold that will trigger a positive purchasing decision for product P. The task is to determine an optimal pricing threshold for product P associated with each individual consumer and then make that discounted offer available for the individual consumer in order to trigger a positive purchasing decision. In other words, the individualized discounted offer involves consumer C1 being offered price PP1, consumer C2 being offered price PP2, and consumer C3 being offered price PP3 for product P. Each consumer C1-C3 should make the decision to purchase product P, albeit, each with a separate price point set by an individualized discounted offer. Consumer service provider 72 makes possible the individual consumer targeted marketing with the consumer-specific, personalized "one-to-one" offers as a more effective approach for retailers to maximize revenue as compared to the same discounted price for every consumer under mass marketing. Consumer service provider 72 becomes the preferred source of retail information for the consumer, i.e., an aggregator of retailers capable of providing one-stop shopping for many purchasing options. The individualized discounted offers enable market segmentation to the "one-to-one" level with each individual consumer receiving personalized pricing for a specific product.

In order to generate the consumer model or comparative shopping service, personal assistant engine 74 must have access to comprehensive, reliable, and objective retailer product information. The retailer product information is combined with the consumer's profile and list of products of interest with weighted attributes from webpage 138 to generate an optimized shopping list for a specific consumer with an individualized discounted offer for each product on the list.

Figure 10:
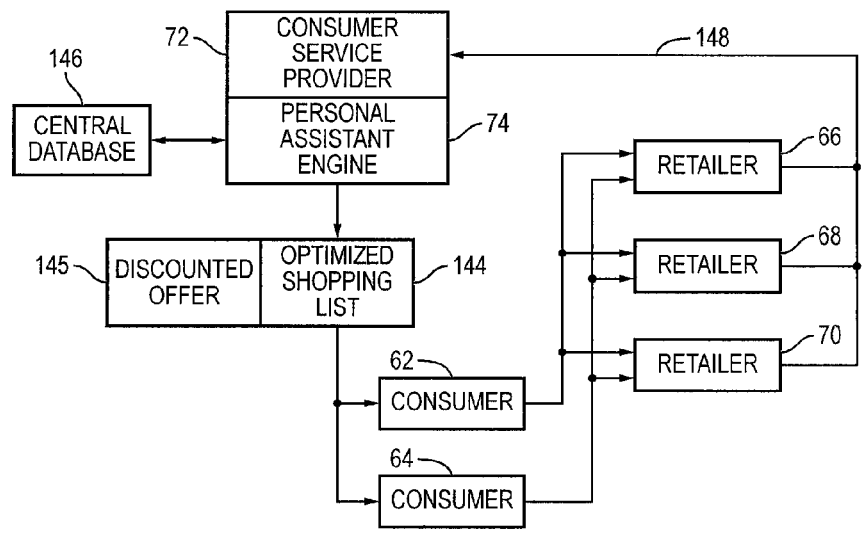
FIG. 10 illustrates interaction between consumers and retailers with the aid of the personal assistant engine to create an optimized shopping list for the benefit of the consumer.

Given the consumer generated shopping list from FIG. 8, personal assistant engine 74 executes a consumer model or comparative shopping service to optimize the shopping list and determine which products should be purchased from which retailers on which day to maximize the value to the consumer as defined by the consumer profile and list of products of interest with weighted attributes from webpage 138. Personal assistant engine 74 also generates for each specific consumer an individualized discounted offer 145 for each product on optimized shopping list 144, as shown in FIG. 10. The individualized discounted offer is crafted for each individual consumer based on a product specific preference value of the consumer weighted attributes, see further discussion below. Each consumer receives an individualized "one-to-one" offer 145. That is, the optimized shopping list for consumer 62 will have an individualized discounted offer 145 for product P1 based on the product specific preference value of the consumer 62 weighted attributes. The optimized shopping list for consumer 64 may have a different individualized discounted offer 145 for the same product P1 based on the product specific preference value of the consumer 64 weighted attributes. The individualized discounted offer 145 should be set to trigger a positive purchasing decision for each consumer. The products that show up on optimized shopping list 144 are the products of interest to the consumer offered at the most valued price.

The consumer patronizes retailers 66-70, either in person or online, with optimized shopping list 144 from personal assistant engine 74 in hand and makes purchasing decisions based on the recommendations on the optimized shopping list. The consumers can rely on personal assistant engine 74 as having produced a comprehensive, reliable, and objective shopping list in view of the consumer's profile and weighted product preferences, as well as retailer product information, that will yield the optimal purchasing decision to the benefit of the consumer. The individualized discounted price should be set to trigger the purchasing decision. Personal assistant engine 74 helps consumers quantify and develop confidence in making a good decision to purchase a particular product from a particular retailer at the individualized "one-to-one" discounted offer. While the consumer makes the decision to place the product in the basket for purchase, he or she comes to rely upon or at least consider the recommendations from consumer service provider 72, i.e., optimized shopping list 144 contributes to the tipping point for consumers to make the purchasing decision. The consumer model generated by personal assistant engine 74 thus in part controls many of the purchasing decisions and other aspects of commercial transactions within commerce system 60.

In order to generate the consumer model or comparative shopping service, personal assistant engine 74 must have access to up-to-date, comprehensive, reliable, and objective retailer product information. The retailer product information is combined with the consumer's profile and list of products of interest with weighted attributes from webpage 138, as well as the individualized discounted offer 145, to generate optimized shopping list 144. Consumer service provider 72 maintains a central database 146 of up-to-date, comprehensive, reliable, and objective retailer product information. The product information includes the product description, product attributes, regular retail pricing, and individualized discounted offers that the retailer would be willing to accept for the likelihood of making a sale. Consumer service provider 72 must actively and continuously gather up-to-date product information in order to maintain central database 146. In one approach to gathering product information, retailers 66-70 may grant access to T-LOG data 46 for use by consumer service provider 72. T-LOG data 46 collected during consumer check-out can be sent electronically from retailers 66-70 to consumer service provider 72, as shown by communication link 148 in FIG. 10. As noted in the background, retailers may be reluctant to grant access to T-LOG data 46, particularly without quid pro quo. However, as consumer service provider 72 gains acceptance and consumers 62-64 come to rely on the service to make purchase decisions, retailer 66-70 will be motivated to participate.

Assuming one or more retailers 66-70 choose to grant access to T-LOG data 46, the retailers may also define a maximum retailer acceptable discounted price for each product that can be used by consumer service provider 72 to trigger a positive purchasing decision by consumers 62-64. The maximum retailer acceptable discounted price is typically determined by the retailer's profit margin. If product P costs $1.50 to manufacture, distribute, and sell, and the regular price is $2.50, then the retailer has at most $1.00 in profit to offer as a discount without creating an operating loss. In this case, the maximum retailer acceptable discounted price is $1.00 or less, depending on how much profit margin the retailer is willing to forego in order to make the sale.

Figure 11:
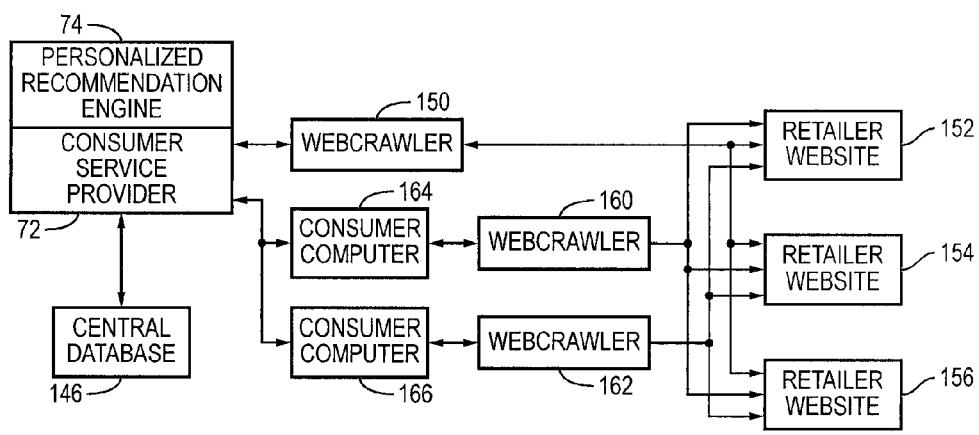
FIG. 11 illustrates collecting product information from retailer websites directly by the consumer service provider or indirectly using consumer computers.

One or more retailers 66-70 may decline to provide access to its T-LOG data for use with personal assistant engine 74. In such cases, consumer service provider 72 can exercise a number of alternative data gathering approaches and sources. In one embodiment, consumer service provider 72 utilizes computer-based webcrawlers or other searching software to access retailer websites for pricing and other product information. In FIG. 11, webcrawler 150 operates within the software of computer 100 or 114 used by consumer service provider 72. Consumer service provider 72 dispatches webcrawler 150 to make requests for product information from websites 152, 154, and 156 of retailers 66, 68, and 70, respectively. Webcrawler 150 collects and returns the product information to personal assistant engine 74 for storage within central database 146. For example, webcrawler 150 identifies products available from each of retailer websites 152-156 and requests pricing and other product information for each of the identified products. Webcrawler 150 navigates and parses each page of retailer websites 152-156 to locate pricing and other product information. The parsing operation involves identifying and recording product description, universal product code (UPC), price, ingredients, size, and other product information as recovered by webcrawler 150 from retailer websites 152-156. In particular, the parsing operation can identify discounted offers and special pricing from retailers 66-70. The discounted pricing can be used in part to formulate the individualized "one-to-one" offers. The product information from retailer websites 152-156 is sorted and stored in central database 146.

Consumer service provider 72 can also dispatch webcrawlers 160 and 162 from computers 164 and 166 used by consumers 62-64, or from consumer cell phone 116, or other electronic communication device, to access and request product information from retailer websites or portals 152-156 or other electronic communication medium or access point. During the registration process of FIG. 6, consumer service provider 72 acquires the IP address of consumer computers 164 and 166, as well as the permission of the consumers to utilize the consumer computer and login to access retailer websites 152-156. Consumer service provider 72 causes webcrawlers 160-162 to be dispatched from consumer computers 164-166 and uses the consumer login to retailer websites 152-156 to access and request product information from retailers 66-70. Webcrawlers 160-162 collect the product information from retailer websites 152-156 through the consumer computer and login and return the product information to personal assistant engine 74 for storage within central database 146. The execution of webcrawlers 160-162 from consumer computers 164-166 distributes the computational work.

For example, the consumer logs into the website of consumer service provider 72 via webpage 136. Consumer service provider 72 initiates webcrawler 160 in the background of consumer computer 164 with a sufficiently low execution priority to avoid interfering with other tasks running on the computer. The consumer can also define the time of day and percent or amount of personal computer resources allocated to the webcrawler. The consumer can also define which retailer websites and products, e.g., by specific retailer, market, or geographic region, that can be accessed by the webcrawler using the personal computer resources. Webcrawler 160 executes from consumer computer 164 and uses the consumer's login to gain access to retailer websites 152-156. Alternatively, webcrawler 160 resides permanently on consumer computer 164 and runs periodically. Webcrawler 160 identifies products available from each of retailer websites 152-156 and requests pricing and other product information for each of the identified products. Webcrawler 160 navigates and parses each page of retailer websites 152-156 to locate pricing and other product information. The parsing operation involves identifying and recording product description, UPC, price, ingredients, size, and other product information as recovered by webcrawler 160 from retailer websites 152-156. In particular, the parsing operation can identify discounted offers and special pricing from retailers 66-70. The discounted pricing can be used in part to formulate the individualized "one-to-one" discounted offers. The product information from retailer websites 152-156 is sorted and stored in central database 146.

Figures 12, 13:
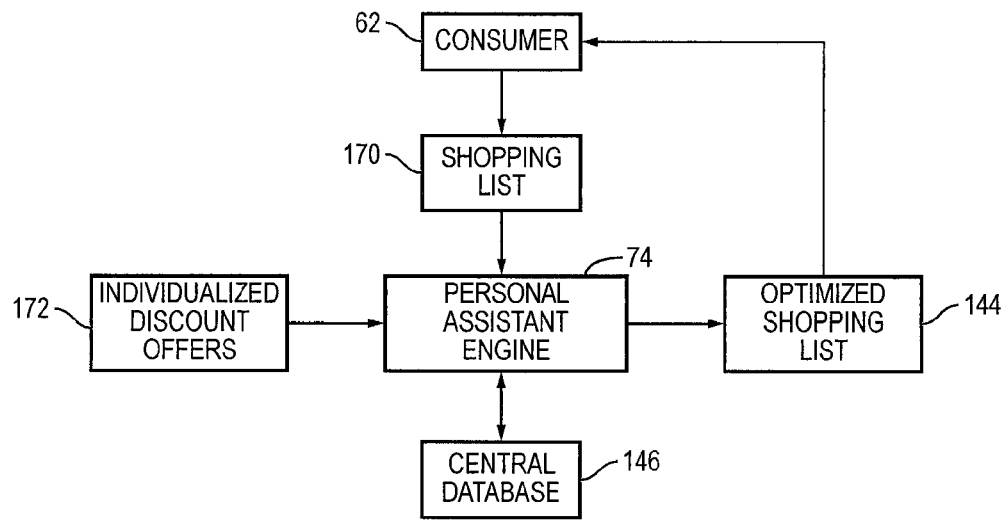
FIG. 12 illustrates comparison of consumer weighted product attributes and retailer product information.
FIG. 13 illustrates generation of an individualized discount for a specific consumer.

Likewise, webcrawler 162 uses consumer computer 166 and login to gain access to retailer websites 152-156. Webcrawler 162 identifies products available from each of retailer websites 152-156 and requests pricing and other product information for each of the identified products. Webcrawler 162 navigates and parses each page of retailer websites 152-156 to locate pricing and other product information. The parsing operation involves identifying and recording product description, UPC, price, ingredients, size, and other product information as recovered by webcrawler 162 from retailer websites 152-156. In particular, the parsing operation can identify discounted offers and special pricing from retailers 66-70. The discounted pricing can be used in part to formulate the individualized "one-to-one" discounted offers. The product information from retailer websites 152-156 is sorted and stored in central database 146. The product information can be specific to the consumer's login. Retailers 66-70 are likely to accept product information requests from webcrawlers 160-162 because the requests originate from consumer computers 164-166 by way of the consumer login With the retailer product information collected and stored in central database 146, personal assistant engine 74 generates optimized shopping list 144 by considering each line item of the consumer's shopping list from webpage 138 and reviewing retailer product information in the central database to determine how to best align each item to be purchased with the available products from the retailers. In addition, personal assistant engine 74 determines the individualized "one-to-one" discounted offer 172, if any, that will be associated with each line item in shopping list 170, as shown in FIG. 12. For example, a particular consumer 62 wants to purchase bread and has provided shopping list 170 with preference levels for weighted product attributes for bread that are important to his or her purchasing decision. Central database 146 contains bread product descriptions, bread product attributes, and pricing for each retailer 66-70. Personal assistant engine 74 reviews the product attributes of each bread product offered by each retailer 66-70, as stored in central database 146.

The product attributes of each bread product for retailers 66-70 in central database 146 are compared to the consumer weighted product attributes in shopping list 170 by personal assistant engine 74. For example, the available bread products from retailer 66 are retrieved and compared to the weighted attributes of consumer 62. Likewise, the available bread products from retailer 68 are retrieved and compared to the weighted attributes of consumer 62, and the available bread products from retailer 70 are retrieved and compared to the weighted attributes of consumer 62. Consumer 62 wants a small loaf with preference level of 7. Those retailers with small loaf bread receive credit or points weighted by the preference level for meeting the consumer's attribute. Otherwise, the retailers receive no credit or points, or less credit or points, because the product attribute does not align or is less aligned with the consumer weighted attribute. Consumer 62 wants whole grain with preference level of 6. Those retailers with whole grain bread receive credit or points weighted by the preference level for meeting the consumer's attribute. Otherwise, the retailers receive no credit or points, or less credit or points, because the product attribute does not align or is less aligned with the consumer weighted attribute. Consumer 62 wants freshness with preference level of 8. Those retailers with fresh bread (say no more than 2 days old) receive credit or points weighted by the preference level for meeting the consumer's attribute. Those retailers with bread more than 2 days old receive less credit or points because the product attribute is less aligned with the consumer weighted attribute. Consumer 62 wants best pricing with preference level of 3. Those retailers with the lowest net price (regular price minus individualized discount for consumer 62) receive the most credit or points weighted by the preference level for being the closest to meeting the consumer's attribute. Those retailers with higher net prices receive less credit or points because the product attribute is less aligned with the consumer weighted attribute.

With respect to pricing, each retailer has two price components: regular price and individualized discounted offers from the regular price that are variable over time and specific to each consumer. The net price to consumer 62 is the regular price less the individualized discounted offer for that consumer. To determine optimal individualized discount needed to achieve a positive consumer purchasing decision for product P from consumer 62, personal assistant engine 74 considers the individualized discounts from each retailer 66-70. In one embodiment, the individualized discount can be a default discount determined by the retailer or personal assistant engine 74 on behalf of the retailer. The default discount is defined to provide a reasonable profit for the retailer as well as reasonable likelihood of attaining the first position on optimized shopping list 144, i.e., the default discounted offer is selected to be competitive with respect to other retailers.

FIG. 13 shows three possible choices for the consumer requested bread product from retailers 66-70, as ascertained from central database 146. Bread brand BB1 from retailer 66 is shown with BB1 product attributes, e.g., small loaf, not whole grain, 3 day freshness, and discounted price of $3.00 (regular price of $4.00 less 1.00 default discounted offer from retailer 66). The "Consumer Value" column shows the value to consumer 62 based on alignment of the BB1 product attributes and the weighted product attributes as defined by the consumer. The BB1 product gets attributes points AP1 for small loaf, no attributes points AP2 for not being whole grain, attribute points AP3 for 3 day freshness, and attributes points AP4 for the $3.00 discounted price. The consumer value (CV) is summation of assigned attributes points for alignment between the product attributes and the weighted product attributes as defined by the consumer times the preference level (normalized to 10) for the weighted product attributes, i.e., $AP1*0.7+AP2*0.6+AP3*0.8+AP4*0.3$. Assume that the BB1 product gets CV of $2.50 USD. The consumer value CV is given in a recognized monetary denomination, such as US dollar (USD), Canadian dollar, Australian dollar, Euro, British pound, Deutsche mark, Japanese yen, and Chinese yuan.

The "Final Price" column shows the final price (FP) offered to the consumer, i.e., regular price less the default discount from retailer 66 ($4.00−1.00=3.00). The "Net Value" column is the net value or normalized value (NV) of the BB1 product to consumer 62. In one embodiment, the net value is the consumer value normalized by the final price, i.e., $NV=CV/FP$. Alternatively, the net value is determined by $NV=(CV-FP)/CV$. Using the first normalizing definition, $NV=2.50/3.00=0.83$. The consumer value CV is less than the final price FP offered by retailer 66, including the default discount. The net value NV to consumer 62 is less than one so the BB1 product will not be a good choice for the consumer. Using the second normalizing definition, $NV=(2.50-3.00)/2.50=-0.20$. The net value NV to consumer 62 is negative so the BB1 product will not be a good choice for the consumer. Consumer 62 is unlikely to buy the BB1 product because the product attributes do not align or match well with the consumer weighted attributes, taking into account the individualized discounted offer. A net value NV less than one or negative indicates that retailer 66 would likely not receive a positive purchasing decision from consumer 62. Personal assistant engine 74 should not recommend the BB1 product to consumer 62 in optimized shopping list 144.

Bread brand BB2 from retailer 68 is shown with BB2 product attributes, e.g., not small loaf, whole grain, 2 day freshness, and pricing of $2.60 (regular price of $3.25 less 0.65 discounted offer from retailer 68). The BB2 product gets no attributes points AP5 for not being a small loaf, attributes points AP6 for whole grain, attribute points AP7 for 2 day freshness, and attributes points AP8 for the $2.60 price. The consumer value is AP5*0.7+AP6*0.6+AP7*0.8+AP8*0.3. Assume that the BB2 product gets CV of $3.10 USD. The final price FP is the regular price less the default discount from retailer 68 ($3.25−0.65=2.60). Using the first normalizing definition, NV=3.10/2.60=1.19. The net value NV to consumer 62 is greater than one so the BB2 product is a possible choice for the consumer. Using the second normalizing definition, NV=(3.10−2.60)/3.10=+0.16. The net value NV to consumer 62 is positive so the BB2 product is a possible choice for the consumer.

Bread brand BB3 from retailer 70 is shown with BB3 product attributes, e.g., small loaf, whole grain, 1 day freshness, and pricing of $2.30 (regular price of $3.20 less 0.90 discounted offer from retailer 70). The BB3 product gets attributes points AP9 for small loaf, attributes points AP10 for whole grain, attributes points AP11 for 1 day freshness, and attributes points AP12 for the $2.40 price. The consumer value is AP9*0.7+AP10*0.6+AP11*0.8+AP12*0.3. Assume that the BB3 product gets CV of $3.40 USD. The final price FP is the regular price less the default discount ($3.20−0.90=2.30). Using the first normalizing definition, NV=3.40/2.30=1.48. The net value NV to consumer 62 is greater than one so the BB3 product is a possible choice for consumer 62. Using the second normalizing definition, NV=(3.40−2.30)/3.40=+0.32. The net value NV to consumer 62 is positive so the BB3 product is a possible choice for the consumer. In fact, based on the default discounted offer from retailers 66-70, the net value of the BB3 product (NV=1.48) is higher than the net value of the BB2 product (NV=1.19) or BB1 product (NV=0.83). The BB3 product is placed on optimized shopping list 144. The BB3 product is the optimal choice for consumer 62 in that if the consumer needs to purchase a bread product, then BB3 is the product most closely aligned with the consumer weighted attributes, i.e., highest net value NV, and would likely receive a positive purchasing decision from consumer 62.

In another embodiment, multiple brands and/or retailers for a single product can be placed on optimized shopping list 144. Personal assistant engine 74 can place, say the top two or top three net value brands and/or retailers on optimized shopping list 144, and allow the consumer to make the final selection and purchasing decision. In the above example, the BB3 product could be placed in first position on optimized shopping list 144 and the BB2 product would be in second position on the optimized shopping list.

The optimal discounted offer tipping point ($P_{TIP}$) for consumer 62 to make a positive purchasing decision between two products can be determined according to $P_{TIP}=CV_K-CV_K*(CV_I-P_I)/CV_I$, where $CV_K$ is the consumer value of product K, $CV_I$ is the consumer value of product I, and $P_I$ is the price of product I.

The optimized individualized discounted offer is in part a competitive process between retailers. Since the consumer needs to purchase the product from someone, the price, tipping point for consumers may involve a comparison of the best available price from competing retailers. In a variation of the previous example, the optimal individualized discounted offer needed to achieve a positive consumer purchasing decision for the product from consumer 62 involves a repetitive process beginning with the regular price less the default discount and then incrementally increasing the individualized discounted offer until the winning retailer is determined. Continuing from the previous example, retailer 68 currently in second position may want to be in first position on optimized shopping list 144. Retailer 68 authorizes personal assistant engine 74 to increase the individualized discounted offer to consumer 62 as necessary to achieve that position. Personal assistant engine 74 increases the individualized discounted offer from retailer 68 by as little as one cent, or fraction of one cent, and recalculates the net value NV to consumer 62. If retailer 68 remains in second position, the discounted offer is incremented again and the net value NV is recalculated. The incremental increases in the individualized discounted offer from retailer 68 continue until retailer 68 achieves first position over retailer 70 on optimized shopping list 144, or until retailer 68 reaches its maximum retailer acceptable discount. The maximum retailer acceptable discount is defined by the retailers based on the profit margin for the product. Retailer 68 will not exceed its maximum retailer acceptable discount as to do so would result in no profit or a loss on the transaction.

If retailer 68 reaches first position over retailer 70 on optimized shopping list 144, then retailer 70 may authorize personal assistant engine 74 to increase its individualized discounted offer to consumer 62 as necessary to regain first position. Personal assistant engine 74 increases the discounted offer from retailer 70 by as little as one cent, or fraction of one cent, and recalculates the net value NV to consumer 62. If retailer 70 remains in second position, the discounted offer is incremented again and the net value NV is recalculated. The incremental increases in the individualized discounted offer from retailer 70 continue until retailer 70 regains first position over retailer 68 on optimized shopping list 144, or until retailer 70 reaches its maximum retailer acceptable discount. Retailer 70 will not exceed its maximum retailer acceptable discount as to do so would result in no profit or a loss on the transaction.

If retailer 70 regains first position over retailer 68 on optimized shopping list 144, then retailer 68 may authorize personal assistant engine 74 to increase its individualized discounted offer to consumer 62 as necessary to regain first position. Retailers 68 and 70 continue jockeying for first position until retailer 68 or 70 reaches its maximum retailer acceptable discount or otherwise withdraws from the competition. In the end, one retailer will be able to make a discounted offer to consumer 62 that achieves first position on optimized shopping list 144 without exceeding its maximum retailer acceptable discount and will remain as winner of the first position. While driving the individualized discount toward the maximum retailer acceptable discount may lead to a winner of the first position among competing retailers, it generally does not result in an individualized discounted offer that is the least discount that the retailer must pay to receive a positive purchasing decision from the consumer.

In another example, the optimal individualized discount needed to achieve a positive consumer purchasing decision for the product from consumer 62 involves a repetitive process beginning with the regular price, or the regular price less the default discount or some initial discount, and then incrementally increasing the individualized discounted offer until the optimal individualized discount is determined. In this case, assume personal assistant engine 74 begins with the regular price for each retailer 66-70. The net value NV is determined for the BB1-BB3 products, as described above; based on the final price FP equal to the regular price for the respective products. The occurrence of a net value NV less than one or negative for particular retailers is not dispositive as the individualized discounted offers have not yet been considered. Personal assistant engine 74 may run the net value calculations based on the regular price to determine the retailer with the highest net value NV for consumer 62. The highest net value retailer based on the regular price is tentatively in first position, although the discounted offer optimization process is just beginning. Personal assistant engine 74 makes a first individualized discounted offer on behalf of each retailer 66-70 and calculates the net value NV for consumer 62, as described above, for each of the BB1-BB3 products. The initial individualized discounted offer can be the default discount for the retailer, or a smaller incremental discount as little as one cent or fraction of one cent. Based on the initial individualized discounted offer, one retailer is determined to provide the highest net value NV for consumer 62. The individualized discounted offer optimization may stop there and the winning retailer will be in first position on optimized shopping list 144. Alternatively, retailers 66-70 authorize personal assistant engine 74 to increment their respective individualized discounted offer to consumer 62. The retailers that did not attain the coveted first position on optimized shopping list 144 after the initial individualized discount may want to continue bidding for that spot. Those retailers that choose to can incrementally increase their respective individualized discounted offer and personal assistant engine 74 recalculates the net value NV to consumer 62, as described above. Based on the revised individualized discounted offer, one retailer is determined to provide the highest net value NV for consumer 62 and will assume or retain first position on optimized shopping list 144.

If the competition among retailers for best net value continues, the retailers will likely drive each other toward the maximum retailer acceptable discount, which minimizes profit for the retailers. That is, the retailers will continue increasing the individualized discounted offer as they compete for first position until further discounts cannot practically be made. To avoid this eventuality, personal assistant engine 74 can set a limit on the number of incremental passes. If a competition among retailers arises, personal assistant engine 74 may limit the number of iterations to, say two or three passes, and let the highest net value retailer after the maximum allowable passes be finally placed in first position on optimized shopping list 144. Retailers 66-70 will make their best offers within the allowable number of iterations and live with the result. Otherwise, without some failsafe in the computer-driven reality of personal assistant engine 74, where the controlling factor is which competing retailer gets to be in first position on optimized shopping list 144, the individualized discounted offer optimization will necessarily drive down the final price toward the maximum retailer acceptable discount. That is, the individualized discounted offer from the winning retailer will not be the smallest discount that would achieve a positive purchasing decision from consumer 62, but rather the final individualized discounted offer would be that which was necessary to place the winning retailer in first position on optimized shopping list 144 over the other competing retailers. Retailers 66-70 and consumer service provider 72 would needlessly lose profit.

In another consideration of optimizing the individualized discounted offer, blindly continuing to increase the individualized discounted offers does not necessarily collectively benefit the retailers. If retailer 68 continues to increase the individually discounted offer in competition with retailer 70, but retailer 68 never reaches or even comes close to first position, the reason can be that the product attributes of retailer 68 are not as well aligned with the consumer weighted attributes as are the product attributes of retailer 70. The net value NV is in part a function of the alignment of the product attributes and the consumer weighted attributes. Retailer 68 will never gain first position over the competing retailer 70 because the product attributes of retailer 70 are better positioned for the purchasing decision by consumer 62. While retailer 68 may not care that he or she is hopelessly driving down the profit for retailer 70 in bidding for first position of the subject product, retailer 68 will care when the alignment roles are reversed for another product on the shopping list of consumer 62 or on another consumer's shopping list. In the role reversal for another product, retailer 70 will be hopelessly driving down the profit of retailer 68. In addition, while blindly increasing the individualized discounted offer may achieve first position for the retailer on optimized shopping list 144, it may fail to set the final price at a profit optimizing level. That is, the individualized discounted offer from the winning retailer may not be the smallest discount that would achieve a positive purchasing decision from consumer 62, but rather the final individualized discounted offer would be that which was necessary to place the winning retailer in first position on optimized shopping list 144 over other competing retailers. Consumer 62 may benefit from the blind competition, but the retailers are needlessly reducing each other's profitability. Accordingly, if after a predetermined number of iterations, and retailer 68 is not making progress in taking over first position from retailer 70, further incremental individualized discounted offers from retailer 68 are suspended. Retailer 70 can assume the foregone conclusion of first position on optimized shopping list 144 while still retaining as much profit as possible in view of the competitive process.

In yet another example, the optimal individualized discount needed to achieve a positive consumer purchasing decision for the product from consumer 62 involves a repetitive process beginning with the regular price less the maximum retailer acceptable discount and then incrementally decreasing the individualized discounted offer, i.e., raising the final price FP for the product, until the optimal individualized discount is determined. In this case, assume personal assistant engine 74 begins with the regular price less the maximum retailer acceptable discount for each retailer 66-70. The net value NV is determined for the BB1-BB3 products, as described above, based on the final price FP equal to the regular price less the maximum retailer acceptable discount for the respective products. The highest net value retailer based on the regular price less the maximum retailer acceptable discount is tentatively in first position.

Retailers 66-70 do not necessarily want to offer every consumer 62-64 the maximum retailer acceptable discount as that would minimize profit for the retailer. Personal assistant engine 74 must determine the price tipping point for consumer 62 to make a positive purchasing decision, i.e., the lowest individualized discounted price that would entice the consumer to purchase one product. Any product with a net value less than one or negative net value given the maximum retailer acceptable discount is eliminated because there is no practical discount, i.e., a discount that still yields a profit for the retailer, that the retailer could offer which would entice consumer 62 to purchase the product. As for the other products, personal assistant engine 74 incrementally modifies the individualized discounted offer to a value less than the maximum retailer acceptable discount, i.e., raises the final price FP (regular price minus the individualized discount) to consumer 62. The modified individualized discounted offer can be a lesser incremental discount, e.g., the default discount or as little as one cent or fraction of one cent less than the maximum retailer acceptable discount. Personal assistant engine 74 recalculates the net value NV for consumer 62, as described above, for each of the remaining BB1-BB3 products (except for eliminated products) at the modified final price point. Based on the modified individualized discounted offer, one retailer is determined to provide the highest net value NV greater than one or positive for consumer 62. The highest net value retailer based on the regular price less the modified individualized discounted offer moves into or retains first position.

Retailers 66-70 authorize personal assistant engine 74 to continue to increment their respective individualized discounted offer to a lesser value and higher final price FP to consumer 62 in moving toward the optimal individualized discount. Personal assistant engine 74 recalculates and tracks the net value of the BB1-BB3 products to consumer 62 during each bidding round of modifying the individualized discounted offers. As the final price FP increases with the lesser discounted offers, the net value for the BB1-BB3 products will one-by-one become less than one or negative using the first and second normalizing definitions, respectively. In other words, at some point in the bidding rounds, the net value of one of the BB1-BB3 products will become less than one or negative. The net value of another BB1-BB3 product will become less than one or negative in the same bidding round or at a later bidding round. The last standing BB1-BB3 product with a net value greater than one or positive, i.e., with the other products having been eliminated or otherwise have dropped out of the competition, is the winning retailer. The last standing BB1-BB3 product with the least individualized discounted offer still yields a net value greater than one or positive value is the price tipping point for consumer 62 to make a positive purchasing decision for one product, i.e., the least individualized discounted offer that would entice the consumer to purchase one product. The winning retailer with the highest net value using the least individualized discounted offer is selected as the best value for consumer 62 and is placed in first position on optimized shopping list 144.

Alternatively, using the maximum retailer acceptable discount as the starting point, personal assistant engine 74 can set a predetermined number of iterations, say two or three passes, before declaring the winning retailer, or one or more retailers may stop further bidding if progress is not being made in moving the retailer into first position. Personal assistant engine 74 can also determine when the relative positions of the retailers in the field are not changing and declare the bidding over. The BB1-BB3 product with the highest net value greater than one or positive value is the optimal price tipping point for consumer 62 to make a positive purchasing decision for the product. The winning retailer is placed in first position on optimized shopping list 144.

In each of the above examples of determining net value for consumer 62, multiple brands and/or retailers for a single product can be placed on optimized shopping list 144. Personal assistant engine 74 can place, say the top two or top three net value brands and/or retailers on optimized shopping list 144, and allow the consumer to make the final selection and purchasing decision.

Figures 14, 15, 16:
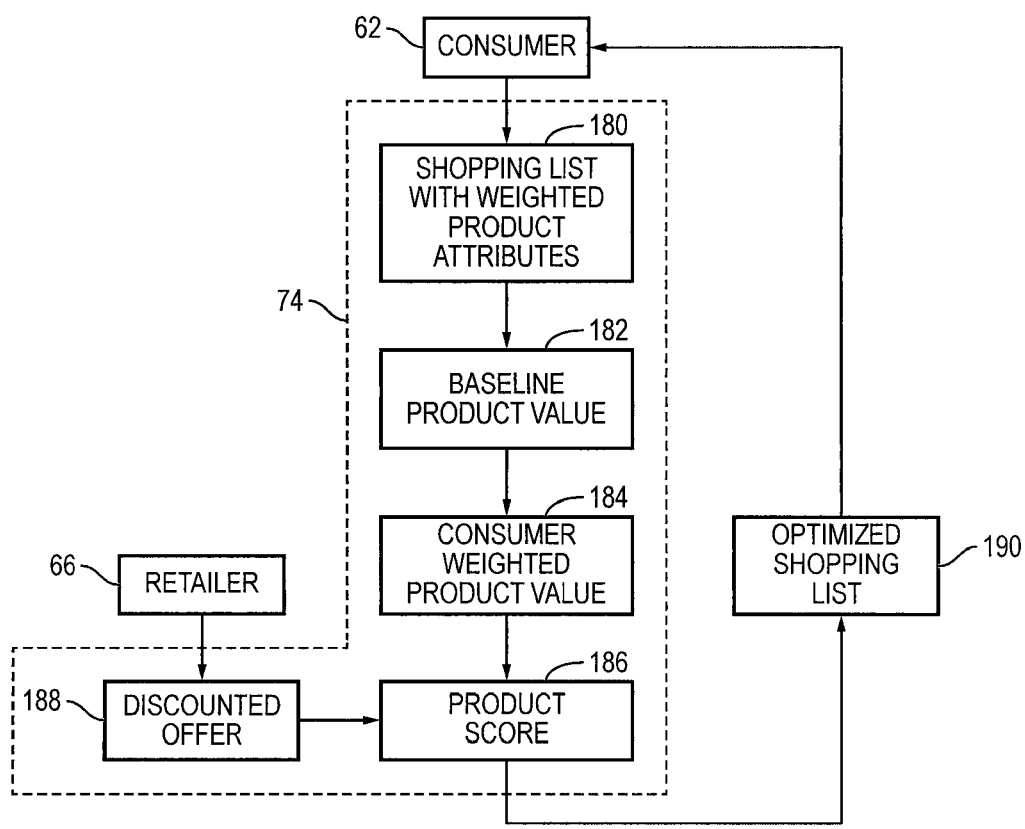
FIG. 14 illustrates the optimized shopping list with the individualized discount for download onto the consumer cell phone.
FIG. 15 illustrates a process of generating an optimized shopping list based on product scores.
FIG. 16 illustrates the optimized shopping list with recommended products and retailers for download onto the consumer cell phone.

FIG. 14 shows optimized shopping list 144 with the BB3 product from retailer 70. The above process is repeated for milk brands MB1, MB2, and MB3, canned soup brands SB1, SB2, and SB3, and detergent brands DB1, DB2, and DB3 based on the product information in central database 146, preference levels for the consumer weighted product attributes, and lowest individualized discount that will result in a positive purchasing decision. The best value product brand for consumer 62 is placed on optimized shopping list 144. In this case, the MB2 product from retailer 68 (NV=1.15), the SB3 product from retailer 70 (NV=1.12), and the DB1 product from retailer 66 (NV=1.10) are determined to be the best value product brand for consumer 62 and are placed on optimized shopping list 144. The other products from retailers 66-70 had a net value less than one or a net value greater than one but less than that of the winning retailer. The optimized shopping list 144 gives consumer 62 the ability to evaluate one or more recommended products, each with an individualized discount customized for consumer 62 to make a positive purchasing decision.

Another optimized shopping list 144 is generated for consumer 64 by repeating the above process using the preference levels for the weighted product attributes as defined by consumer 64. The optimized shopping list 144 for consumer 64 gives the consumer the ability to evaluate one or more recommended products, each with an individualized discount customized for consumer 64 to make a positive purchasing decision. The discounted offer is individualized for each specific consumer 62-64 in that the discount is determined according to the individual consumer price threshold that will trigger a positive purchasing decision for that consumer. The recommended products are objectively and analytically selected from a myriad of possible products from competing retailers according to the consumer weighted attributes. Consumers 62-64 will develop confidence in making a good decision to purchase a particular product from a particular retailer.

Consumers 62-64 can identify the choice of retailers as an attribute. The retailer attribute is a consumer-defined preference level. The consumer may assign value to shopping with a specific retailer because of specific products offered by that store, familiarity with the store layout, good consumer service experiences, or location that is convenient on the way home from work, picking up the children from school, or routine weekend errand route.

Retailers 66-70 will want to show up as the recommended source for as many products as possible on optimized shopping list 144. Primarily, a particular retailer will be the optimized product source when the combination of the individualized discounted price and product attributes offered by the retailer aligns with, or provides maximum net value for the consumer in accordance with, the consumer's profile and shopping list with weighted preferences. Retailers 66-70 can enhance their relative position and provide support for consumer service provider 72 by making T-LOG data 46 available to consumer service provider 72. One way to get a high score when comparing retailer product attributes to the consumer weighted product attributes is to ensure that personal assistant engine 74 has access to the most accurate and up-to-date retailer product attributes via central database 146. Even though a given retailer may have a product with desirable attributes, personal assistant engine 74 cannot record a high score if it does not have complete information about the retailer's products. By giving consumer service provider 72 direct access to T-LOG data 46, the retailer makes the product information readily available to personal assistant engine 74 which will hopefully increase its score and provide more occurrences of the retailer being the recommended source for as many products as possible on optimized shopping list 144. While the use of webcrawlers in FIG. 11 is effective in gathering product information from retailer websites 152-156, direct access to retailer T-LOG data 46 will further aid the consumers in generating optimized shopping list 144.

The optimized shopping list 144 with individualized discounts can be transferred from consumer computers 164-166 to cell phone 116. Consumers 62-64 patronize retailers 66-70, each with optimized shopping list 144 from personal assistant engine 74 in hand and make purchasing decisions based on the recommendations on the optimized shopping list. The individualized discounted prices are conveyed to retailers 66-70 by electronic communication from cell phone 116 to the retailer's check-out register. The discounted pricing can also be conveyed from consumer computer 164-166 directly to retailers 66-70 and redeemed with a retailer loyalty card assigned to the consumer. Retailers 66-70 will have a record of the discounted offers and the loyalty card will match the consumer to the discounted offers on file. In any case, consumers 62-64 each receive an individualized discounted offer as set by personal assistant engine 74.

In another embodiment, continuing from the point that the retailer product information is collected and stored in central database 146 in FIG. 11, consumer 62 creates a shopping list 180 from webpage 138, as shown in FIG. 15. Shopping list 180 includes a plurality of products, such as bread, milk, canned soup, and laundry detergent. Each product will have product attributes weighted by consumer preferences. The consumer weighted attribute values reflect the level of importance or preference that the consumer bestows on each product attribute. For example, consumer 62 identifies products of interest in shopping list 180. Consumers 62 defines one or more product attributes to each product and assigns a weighted preference for each product attribute from 0 (lowest importance) to 9 (highest importance). In one embodiment, the weighted preference is selected with a sliding scale via a computer interface, see FIG. 8. The sliding scale adjusts the preference level of the product attribute by moving a pointer along the length of the sliding scale. Alternatively, a predetermined value can be selected with a click operation via computer interface. The predetermined values can be 0-9, "always", "never", or other designator meaningful to the consumer. The computer interface can be color coded or otherwise highlighted to assist with assigning a preference level for the product attribute.

The available product attributes can be product-specific attributes, diet/health/nutrient related product attributes, lifestyle related product attributes, environment related product attributes, allergen related product attributes, and social/society related product attributes. The product-specific attributes can include brand, ingredients, size, price, freshness, retailer preference, warranty, and the like. In the present example, the consumer preference levels for bread attributes are 7 for small loaf, 6 for whole grain, 8 for freshness, and 3 for price. The consumer preference levels for milk attributes are 5 for gallon container, 7 for 1% low fat, and 6 for price. The consumer preference levels for canned soup attributes are 4 for brand, 3 for product ingredients, and 7 for price. The consumer preference levels for laundry detergent attributes are 6 for biodegradable, 2 for non-scented, and 9 for price.

Personal assistant engine 74 stores shopping list 180 with the weighted product attributes of each specific consumer for future reference and updating. Personal assistant engine 74 can also store prices, product descriptions, names and locations of the retail stores selling the products, offer histories, purchase histories, as well as various rules, policies and algorithms. The individual products in shopping list 180 can be added or deleted and the weighted product attributes can be changed by the consumer or consumer service provider 72. The shopping list 180 entered into personal assistant engine 74 is specific for each consumer and allows consumer service provider 72 to track specific products and preferred retailers selected by the consumer.

In block 182, a baseline product value PV0 is determined for each product or set of products in shopping list 180. The baseline product value PV0 for product P1 category represents a value of product P1 having a baseline set of product attributes. The baseline product value PV0 can be based on an average of preferred product attributes across the consumers registered with consumer service provider 72. The baseline product value PV0 can be based on an average of preferred product attributes across the consumers who regularly patronize the retailer. Alternatively, the baseline product value PV0 can be based on a national average of preferred product attributes for product P1. For example, for the product canned soup, the baseline product attributes can be "11 oz size", "canned soup brand CSB0" and "ingredients I1, I2, and I3", and "regular price of $1.50". Given these baseline product attributes, the baseline product value PV0 is assigned a numeric value. In one example, for canned soup, the baseline product value PV0 is $1.0.

In block 184, a consumer weighted product value PV is determined for product P1 or set of products in shopping list 180. In one embodiment, the consumer weighted product value PV is the baseline product value PV0 modified by the consumer weighted product attribute values in shopping list 180. In a general form, product value PV is given by equation (1).

$$PV = PV0 \, \Pi_A(M_A) \tag{1}$$

where: PV0 is a baseline product value of the product $M_A$ is the product attribute value for product attribute A The product attribute value $M_A$ is expressed as (1+CV %), where CV is a percentage increase or decrease in value of the product to the consumer, given the product has the attribute A with respect to products having no product attribute A or less desirable attribute A. Equation (2) provides another expression of equation (1) in terms of $CV_{An}$ as a percentage increase or decrease in value of the product to the consumer, given the product has the attribute An with respect to products having no product attribute An or less desirable attribute An.

$$PV = PV0 * (1+CV_{A1}\%) * (1+CV_{A2}\%) * (1+CV_{A3}\%) * \ldots * (1+CV_{An}\%) \tag{2}$$

The baseline product value PV0 and consumer weighted product value PV are numeric values in predetermined units of measure. In one embodiment, the unit of measure is currency, such as USD, Canadian dollar, Australian dollar, Euro, British pound, Deutsche mark, Japanese yen, Chinese yuan, or other recognized monetary denomination.

In block 186, a normalized product score PS is determined based on the consumer weighted product value PV and a retailer product value PVR. The consumer weight product value PV and retailer product value PVR have the same units of measure, e.g., a recognized monetary denomination. In one embodiment, PVR is the regular price of the product less any discounted offer from the retailer. Equations (3) and (4) illustrate alternate methods of determining the product score PS.

$$PS = \frac{PV - PVR}{PVR} \tag{3}$$

$$PS = \frac{PV - PVR}{PV} \tag{4}$$

As a numeric example of determining product score PS, consumer 62 has identified canned soup as a product of interest in shopping list 180 with preference levels for weighted product attributes that are important to his or her purchasing decision. Central database 146 contains canned soup product descriptions, product attributes, and pricing for each retailer 66-70. Personal assistant engine 74 reviews the product attributes of each canned soup product offered by each retailer 66-70, as stored in central database 146. The product attributes of each canned soup product offered by retailers 66-70 in central database 146 are compared to the consumer weighted product attributes in shopping list 180 by personal assistant engine 74. For example, the available canned soup products from retailer 66 are retrieved and compared to the weighted attributes of consumer 62. Likewise, the available canned soup products from retailer 68 are retrieved and compared to the weighted attributes of consumer 62, and the available canned soup products from retailer 70 are retrieved and compared to the weighted attributes of consumer 62.

Consumer 62 wants a specific brand (attribute A1) with preference level of 4. Those retailers that stock the preferred brand receive credit or points weighted by the preference level for the consumer's attribute. Otherwise, the retailers receive no credit or points, or less credit or points, because the product attribute does not align or is less aligned with the consumer weighted attribute. Consumer 62 wants specific ingredients (attribute A2) with preference level of 3. Those retailers with canned soup containing the preferred ingredients I1-I3 receive credit or points weighted by the preference level for the consumer's attribute. Otherwise, the retailers receive no credit or points, or less credit or points, because the product attribute does not align or is less aligned with the consumer weighted attribute. Consumer 62 wants a best pricing (attribute A3) with preference level of 7. Those retailers with the lowest net price (regular price minus discounted offer for consumer 62) receive the most credit or points weighted by the preference level for being the closest to meeting the consumer's attribute. Those retailers with higher net prices receive no credit or points, or less credit or points, because the product attribute does not align or is less aligned with the consumer weighted attribute.

With respect to pricing, each retailer has two price components: regular price and discounted offers from the regular price that are variable over time and specific to each consumer. Personal assistant engine 74 determines a discounted offer 188, if any, that will be associated with each line item in shopping list 180. For example, a particular consumer 62 wants to purchase canned soup and has provided shopping list 180 with preference levels for weighted product attributes for canned soup that are important to his or her purchasing decision. Central database 146 contains canned soup product descriptions, canned soup product attributes, and pricing for each retailer 66-70. Personal assistant engine 74 reviews the product attributes of each canned soup product offered by each retailer 66-70, as stored in central database 146, and determines a discounted offer to consumer 62. The net price to consumer 62 is the regular price less the discounted offer for that consumer.

To determine the optimal discount needed to achieve a positive consumer purchasing decision for product P1 from consumer 62, personal assistant engine 74 considers the available discounts from each retailer 66-70. In one embodiment, an individualized discounted offer is determined by the retailer or personal assistant engine 74 on behalf of the retailer. The individualized discounted offer can initially be a default discounted offer defined to provide a reasonable profit for the retailer as well as reasonable likelihood of attaining the first position on optimized shopping list 190, i.e., a default discounted offer is selected to be competitive with respect to other retailers. The individualized discounted offer can be adjusted to give the retailer first position on optimized shopping list 190, as described above.

With respect to retailer 66, the retailer stocks the preferred brand and receives credit or points (0.5) for attribute A1 with consumer preference level of 4. The percent change in $CS_{A1}$ (with preference level normalized to 10) is 0.5*0.4=0.2. The preferred brand of canned soup from retailer 66 has the preferred ingredients I1-I3 and receives credit or points (0.5) for attribute A2 with consumer preference level of 3. The percent change in $CS_{A2}$ is 0.5*0.3=0.15. The preferred brand of canned soup from retailer 66 has a regular price of $1.50 and an individualized discounted offer of $0.50. With a net price of $1.00, retailer 66 receives credit or points (0.5) for attribute A3 with consumer preference level of 7. The percent change in $CS_{A2}$ is 0.5*0.7=0.35. The consumer weighted product value PV from equation (2) for the canned soup product from retailer 66 is 1.0*(1+0.2)*(1+0.15)*(1+0.35)=1.863.

With respect to retailer 68, the retailer stocks the preferred brand and receives credit or points (0.5) for attribute A1 with consumer preference level of 4. The percent change in $CS_{A1}$ is 0.5*0.4=0.2. The preferred brand of canned soup from retailer 68 has the preferred ingredients I1-I2, but not I3, and receives credit or points (0.2) for attribute A2 with consumer preference level of 3. The percent change in $CS_{A2}$ is 0.2*0.3=0.06. The preferred brand of canned soup from retailer 68 has a regular price of $1.80 and an individualized discounted offer of $0.60. With a net price of $1.20, retailer 70 receives credit or points (0.4) for attribute A3 with consumer preference level of 7. The percent change in $CS_{A2}$ is 0.4*0.7=0.28. The consumer weighted product value PV from equation (2) for the canned soup product from retailer 68 is 1.0*(1+0.2)*(1+0.06)*(1+0.28)=1.628.

With respect to retailer 70, the retailer does not stock the preferred brand and receives credit or points (−0.5) for attribute A1 with consumer preference level of 4. The percent change in $CS_{A1}$ is −0.5*0.4=−0.2. A non-preferred brand of canned soup from retailer 70 has the preferred ingredients I1-I3 and receives credit or points (0.5) for attribute A2 with consumer preference level of 3. The percent change in $CS_{A2}$ is 0.5*0.3=0.15. The non-preferred brand of canned soup from retailer 70 has a regular price of $1.60 and no discounted offer. With a price of $1.60, retailer 70 receives credit or points (−0.2) for attribute A3 with consumer preference level of 7. The percent change in $CS_{A2}$ is −0.2*0.7=−0.14. The consumer weighted product value PV from equation (2) for the canned soup product from retailer 68 is 1.0*(1−0.2)*(1+0.15)*(1−0.14)=0.791.

The product score PS is an indicator of the relative competitive positions between retailers 66-70 as the best choice for consumer 62. The product scores PS for the canned soup products from retailers 66-70 are determined from equation (3). For retailer 66, the product score PS is (1.863−1.00)/1.00=0.863. For retailer 68, the product score PS is (1.628−1.20)/1.20=0.357. For retailer 70, the product score PS is (0.791−1.60)/1.60=−0.506. Alternatively, the product scores PS for the canned soup products from retailers 66-70 are determined from equation (4). For retailer 66, the product score PS is (1.863−1.00)/1.863=0.463. For retailer 68, the product score PS is (1.628−1.20)/1.628=0.263. For retailer 70, the product score PS is (0.791−1.60)/0.791=−1.023.

The product score PS for retailer 66 is greater than the product score PS for retailer 68 or the product score PS for retailer 70. The product score PS for retailer 68 is greater than the product score PS for retailer 70, but less than the product score PS for retailer 66. The product score PS for retailer 70 is less than the product score PS for retailer 66 or the product score PS for retailer 68. Accordingly, retailer 66 is in first position, retailer 68 is in second position, and retailer 70 is in third position as the best choice for consumer 62. The canned soup product from retailer 66 is placed on optimized shopping list 190 for consumer 62.

In another embodiment, multiple brands and/or retailers for a single product can be placed on optimized shopping list 190. Personal assistant engine 74 can place, say the top two or top three net value brands and/or retailers on optimized shopping list 190, and allow the consumer to make the final selection and purchasing decision. In the above example, the canned soup product from retailer 66 is placed in first position on optimized shopping list 190 and the canned soup product from retailer 68 is placed in second position on the optimized shopping list.

The analysis of determining consumer weighted product values and product scores for each retailer 66-70, as described above, is repeated for each product on shopping list 180. Personal assistant engine 74 generates optimized shopping list 190 by considering each line item of the consumer's shopping list from webpage 138 and reviewing retailer product information in the central database to determine how to best align each item to be purchased with the available products from the retailers. In the present example, the retailer in first position for each product on shopping list 180 is placed on optimized shopping list 190.

FIG. 16 shows optimized shopping list 190 with recommendations for consumer 62. The optimized shopping list 190 can include entries for product category, recommended product, recommended retailer, quantity, price, and product score. The optimized shopping list 190 shows the recommended bread product from retailer 66, recommended milk product from retailer 68, recommended canned soup product from retailer 66, and recommended laundry product from retailer 70. The optimized shopping list 190 can be sorted by retailer, product category, day of week, or otherwise to organize and simplify the shopping process. Consumer 62 patronizes retailers 66-70 and purchases the needed products on optimized shopping list 190.

Another optimized shopping list 190 is generated for consumer 64 by repeating the above process using the preference levels for the weighted product attributes as defined by consumer 64. The optimized shopping list 190 for consumer 64 gives the consumer the ability to evaluate one or more recommended products, each with an individualized discount customized for consumer 64 to make a positive purchasing decision. The discounted offer is individualized for each specific consumer 62-64 in that the discount is determined according to the individual consumer price threshold that will trigger a positive purchasing decision for that consumer. The recommended products are objectively and analytically selected from a myriad of possible products from competing retailers according to the consumer weighted attributes.

Consumers 62-64 can rely on personal assistant engine 74 as having produced a comprehensive, reliable, and objective shopping list in view of the consumer's profile and preference level for each weighted product attribute, as well as retailer product information and the individualized discounted offer, that will yield the optimal purchasing decision for the benefit of the consumer. Personal assistant engine 74 helps consumers 62-64 quantify and evaluate, from a myriad of potential products on the market from competing retailers, a smaller, optimized list objectively and analytically selected to meet their needs while providing the best net value. Consumers 62-64 will develop confidence in making a good decision to purchase a particular product from a particular retailer. While the consumer makes the decision to place the product in the basket for purchase, he or she comes to rely upon or at least consider the recommendations from consumer service provider 72, i.e., optimized shopping list 190 with the embedded individualized discount contributes to the tipping point for consumers to make the purchasing decision. The consumer model generated by personal assistant engine 74 thus in part controls many of the purchasing decisions and other aspects of commercial transactions within commerce system 60.

The purchasing decisions actually made by consumers 62-64 while patronizing retailers 66-70 can be reported back to consumer service provider 72. Upon completing the check-out process, the consumer is provided with an electronic receipt of the purchases made. The electronic receipt is stored in cell phone 116, downloaded to personal assistant engine 74, and stored in central database for comparison to optimized shopping list 190. The actual purchasing decisions made when patronizing retailers 66-70 may or may not coincide with the preference levels or weighted attributes assigned by the consumer when constructing the original shopping list. For example, in choosing the canned soup, consumer 62 may have decided at the time of making the purchasing decision that one product attribute, e.g., product ingredients, was more important than another product attribute, e.g., brand. Consumer 62 made the decision to deviate from optimized shopping list 190, based on product ingredients, to choose a different product than the one recommended on the optimized shopping list. Personal assistant engine 74 can prompt consumer 62 for an explanation of the deviation from optimized shopping list 190, i.e., what product attribute became the overriding factor at the moment of making the purchasing decision. Personal assistant engine 74 learns from the actual purchasing decisions made by consumer 62 and can update the preference levels of the consumer weighted product attributes. The preference level for product ingredients can be increased and/or the preference level for brand can be decreased. The revised preference levels for the consumer weighted product attributes will improve the accuracy of subsequent optimized shopping lists. The pricing and other product information uploaded from cell phone 116 after consumer check-out to personal assistant engine 74 can also be used to modify the product information, e.g., pricing, in central database 146.

Figure 17:
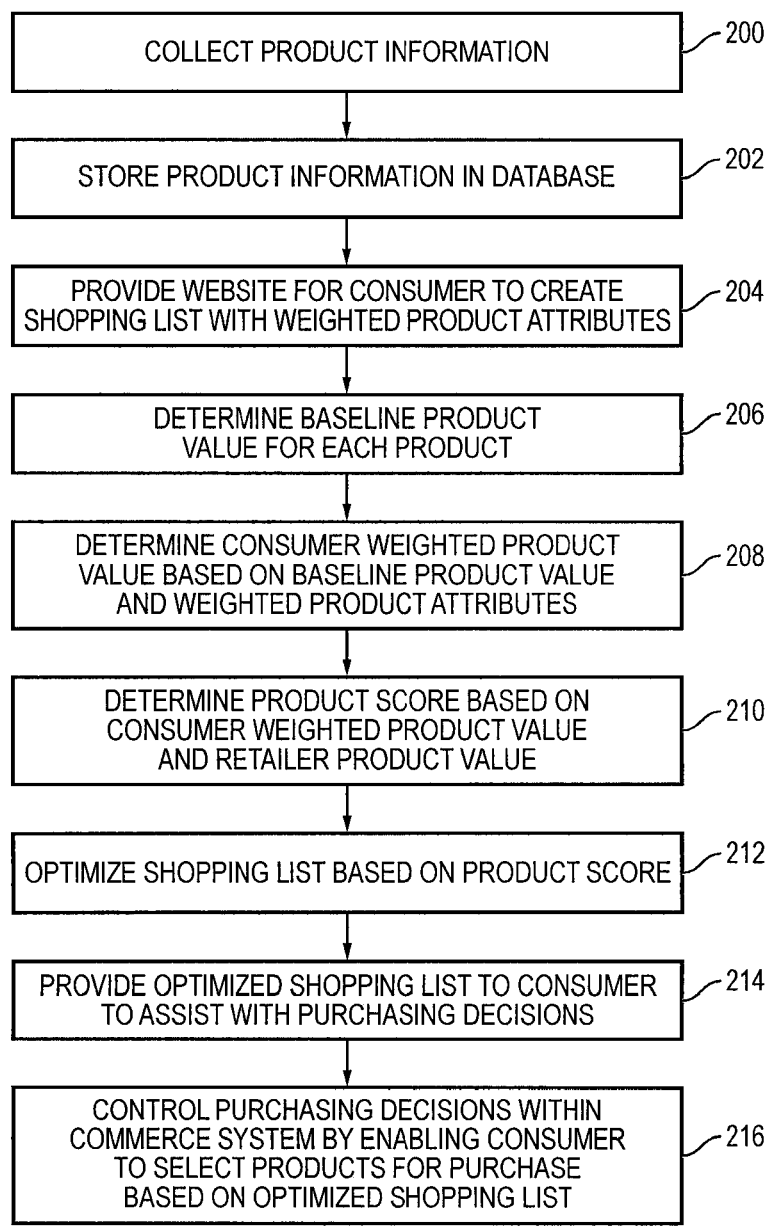
FIG. 17 illustrates the process of controlling consumer purchasing decisions within a commerce system using an optimized shopping list with recommended products and retailers.

FIG. 17 illustrates a process for controlling a commerce system by enabling the consumer to select the products for purchase based on the optimized shopping list. In step 200, product information is collected for a plurality of products. In step 202, the product information is stored in a database. In step 204, a website is provided for a consumer to create a shopping list with weighted product attributes using a sliding scale. In step 206, a baseline product value is determined for each of the plurality of products. In step 208, a consumer weighted product value is determined based on the baseline product value and the weighted product attributes. The consumer weighted product value is determined by $PV0*(1+CV_{A1}\%)*(1+CV_{A2}\%)*(1+CV_{A3}\%)* \ldots *(1+CV_{An}\%)$, where PV0 is the baseline product value and $CV_{An}$ as a percentage increase or decrease in value of the product to the consumer, given the weighted product attributes An. The baseline product value and consumer weight product value can be assigned common monetary units of measure. An individualized discounted offer is generated for the consumer. In step 210, a product score is determined based on the consumer weighted product value and retailer product value. The product score is determined by $(PV-PVR)/PVR$ or $(PV-PVR)/PV$, where PV is the consumer weighted product value and PVR is the retailer product value. In step 212, the shopping list is optimized based on the product score. In step 214, the optimized shopping list is provided to the consumer to assist with purchasing decisions. In step 216, purchasing decisions within the commerce system are controlled by enabling the consumer to select the products for purchase based on the optimized shopping list.

In summary, the consumer service provider in part controls the movement of goods between members of the commerce system. The personal assistant engine offers consumers economic and financial modeling and planning, as well as comparative shopping services, to aid the consumer in making purchase decisions by optimizing the shopping list according to consumer-weighted product attributes. The optimized shopping list requires access to retailer product information. The consumer service provider uses a variety of techniques to gather product information from retailer websites and in-store product checks made by the consumer. The optimized shopping list helps the consumer to make the purchasing decision based on comprehensive, reliable, and objective retailer product information, as well as an individualized discounted offer. The consumer makes purchases within the commerce system based on the optimized shopping list and product information compiled by the consumer service provider. By following the recommendations from the consumer service provider, the consumer can receive the most value for the money. The consumer service provider becomes the preferred source of retail information for the consumer, i.e., an aggregator of retailers capable of providing one-stop shopping.

By following the recommendations from the consumer service provider, the consumer can receive the most value for the money. Where retailers historically had an advantage over consumers with economic modeling to optimize profits, the consumer service provider has leveled the playing field by optimizing the purchasing decision within the commerce system for the benefit of the consumer.

While one or more embodiments of the present invention have been illustrated in detail, the skilled artisan will appreciate that modifications and adaptations to those embodiments may be made without departing from the scope of the present invention as set forth in the following claims.

What is claimed:

1. A method of controlling a commerce system, comprising:
    collecting product information for a plurality of products;
    storing the product information in a database and on a computer-readable storage medium;
    providing a website for a consumer to create a shopping list including weighted product attributes;
    determining a baseline product value for each of the plurality of products;
    determining a consumer weighted product value based on the baseline product value and the weighted product attributes;
    determining a product score based on the consumer weighted product value;
    optimizing the shopping list based on the product score using a processor;
    providing the optimized shopping list including an individualized offer to the consumer to assist with purchasing decisions; and
    controlling the purchasing decisions within the commerce system by enabling the consumer to select the products for purchase based on the optimized shopping list.

2. The method of claim 1, further including determining the consumer weighted product value by $PV0*(1+CV_{A1}\%)*(1+CV_{A2}\%)*(1+CV_{A3}\%)* \ldots *(1+CV_{An}\%)$, where PV0 is the baseline product value and $CV_{An}$ as a percentage increase or decrease in value of the product to the consumer, given the weighted product attributes An.

3. The method of claim 1, further including determining the product score by (PV−PVR)/PVR or (PV−PVR)/PV, where PV is the consumer weighted product value and PVR is a retailer product value.

4. The method of claim 1, further including generating a discounted offer for the consumer.

5. The method of claim 1, further including assigning monetary units of measure to the baseline product value and consumer weight product value.

6. The method of claim 1, further including assigning the weighted product attributes with a sliding scale.

7. A method of controlling a commerce system, comprising:
    generating a shopping list for a consumer containing a product including weighted product attributes;
    determining a baseline product value for the product;
    determining a consumer weighted product value based on the baseline product value and the weighted product attributes;
    determining a product score based on the consumer weighted product value;
    optimizing the shopping list based on the product score using a processor; and
    utilizing the optimized shopping list to control purchasing decisions within the commerce system by enabling the consumer to select the product for purchase based on the optimized shopping list.

8. The method of claim 7, further including:
    collecting product information for the product; and
    storing the product information in a database.

9. The method of claim 7, further including determining the consumer weighted product value by $PV0*(1+CV_{A1}\%)*(1+CV_{A2}\%)*(1+CV_{A3}\%)* \ldots *(1+CV_{An}\%)$, where PV0 is the baseline product value and $CV_{An}$ as a percentage increase or decrease in value of the product to the consumer, given the weighted product attributes An.

10. The method of claim 7, further including determining the product score by (PV−PVR)/PVR or (PV−PVR)/PV, where PV is the consumer weighted product value and PVR is a retailer product value.

11. The method of claim 7, further including generating a discounted offer for the consumer.

12. The method of claim 7, further including providing a website for the consumer to create the shopping list with the weighted product attributes.

13. The method of claim 7, further including assigning monetary units of measure to the baseline product value and consumer weight product value.

14. A method of controlling a commerce system, comprising:
    generating a shopping list for a consumer containing a product;
    determining a product score for the product using a processor;
    optimizing the shopping list based on the product score and including an individualized offer; and
    utilizing the optimized shopping list to control purchasing decisions within the commerce system by enabling the consumer to select the product for purchase based on the optimized shopping list.

15. The method of claim 14, further including:
    collecting product information for the product; and
    storing the product information in a database.

16. The method of claim 14, further including:
determining a baseline product value for the product;
determining a consumer weighted product value for the product; and
determining the consumer weighted product value based on the baseline product value and weighted product attributes.

17. The method of claim 16, further including determining the consumer weighted product value by $PV0*(1+CV_{A1}\%)*(1+CV_{A2}\%)*(1+CV_{A3}\%)* \ldots *(1+CV_{An}\%)$, where PV0 is the baseline product value and $CV_{An}$ as a percentage increase or decrease in value of the product to the consumer, given the weighted product attributes An.

18. The method of claim 17, further including determining the product score by (PV−PVR)/PVR or (PV−PVR)/PV, where PV is the consumer weighted product value and PVR is a retailer product value.

19. The method of claim 14, further including generating a discounted offer for the consumer.

20. The method of claim 14, further including providing a website for the consumer to create the shopping list including weighted product attributes.

21. A computer program product usable with a programmable computer processor having a computer readable program code embodied in a non-transitory computer usable medium for controlling a commerce system, comprising:
generating a shopping list for a consumer containing a product including weighted product attributes;
determining a consumer weighted product value for the product;
determining a product score based on the consumer weighted product value;
optimizing the shopping list based on the product score and including a recommended product; and
utilizing the optimized shopping list to control purchasing decisions within the commerce system by enabling the consumer to select the product for purchase based on the optimized shopping list.

22. The computer program product of claim 21, further including:
determining a baseline product value for the product; and
determining the consumer weighted product value based on the baseline product value and the weighted product attributes.

23. The computer program product of claim 22, further including determining the consumer weighted product value by $PV0*(1+CV_{A1}\%)*(1+CV_{A2}\%)*(1+CV_{A3}\%)* \ldots *(1+CV_{An}\%)$, where PV0 is the baseline product value and $CV_{An}$ as a percentage increase or decrease in value of the product to the consumer, given the weighted product attributes An.

24. The computer program product of claim 21, further including determining the product score by (PV−PVR)/PVR or PV−PVR)/PV, where PV is the consumer weighted product value and PVR is a retailer product value.

25. The computer program product of claim 21, further including generating a discounted offer for the consumer.

\* \* \* \* \*